(12) United States Patent
Meinhold et al.

(10) Patent No.: US 12,471,991 B2
(45) Date of Patent: Nov. 18, 2025

(54) METHOD AND SYSTEM FOR GUIDING A POSITIONING INSTRUMENT

(71) Applicants: Georgia Tech Research Corporation, Atlanta, GA (US); The Trustees of Stevens Institute of Technology, Hoboken, NJ (US)

(72) Inventors: Waiman Meinhold, Atlanta, GA (US); Mehmet Kurt, Hoboken, NJ (US); Efe Ozkaya, Hoboken, NJ (US); Jun Ueda, Atlanta, GA (US)

(73) Assignees: Georgia Tech Research Corporation, Atlanta, GA (US); The Trustees of Stevens Institute of Technology, Hoboken, NJ (US)

(*) Notice: Subject to any disclaimer, the term of this patent is extended or adjusted under 35 U.S.C. 154(b) by 529 days.

(21) Appl. No.: 17/916,469

(22) PCT Filed: Mar. 31, 2021

(86) PCT No.: PCT/US2021/025131
§ 371 (c)(1),
(2) Date: Sep. 30, 2022

(87) PCT Pub. No.: WO2021/202697
PCT Pub. Date: Oct. 7, 2021

(65) Prior Publication Data
US 2023/0172662 A1 Jun. 8, 2023

Related U.S. Application Data

(60) Provisional application No. 63/002,558, filed on Mar. 31, 2020.

(51) Int. Cl.
*A61B 18/20* (2006.01)
*A61B 34/20* (2016.01)
(Continued)

(52) U.S. Cl.
CPC .............. *A61B 18/20* (2013.01); *A61B 34/30* (2016.02); *A61B 90/11* (2016.02); *A61B 1/04* (2013.01);
(Continued)

(58) Field of Classification Search
CPC ......... A61B 18/20; A61B 34/30; A61B 90/11; A61B 1/04; A61B 2034/2059;
(Continued)

(56) References Cited

U.S. PATENT DOCUMENTS 8,758,263 B1 * 6/2014 Rahimian .............. A61B 90/11
600/415
2008/0097195 A1 4/2008 Urquhart
(Continued)

OTHER PUBLICATIONS

Pari, Sebastian, Traslosheros and Angel—Image Based Visual Servoing: Estimated Image Jacobian by using Fundametal Matrix vs Analytic Jacobian, pp. 706-717 (Year: 2008).*
(Continued)

*Primary Examiner* — Juan M Guillermety
(74) *Attorney, Agent, or Firm* — Meunier Carlin & Curfman LLC

(57) ABSTRACT

An exemplary robotic system and control method is disclosed that employs magnetic-resonance imaging (MRI) guided visual-servo positioning of a medical robot system. In an example, an MR Elastography (MRE) actuator system is disclosed that employs the exemplary MRI-guided visual servoing to assess tissues based on its mechanical properties. The exemplary MRI-guided positioning is directly and solely used as a feedback sensor through its visual output to control multiple degrees of movement of the MRE actuators. The exemplary MRI-guided positioning may be employed in various diagnostics, minimally invasive surgery, or medical procedures for any number of a medical instrument and
(Continued)

interventional procedures that can be conducted in an MRI environment or in proximity to an MRI scanner.

16 Claims, 16 Drawing Sheets

(51) Int. Cl.
  *A61B 34/30* (2016.01)
  *A61B 90/11* (2016.01)
  *A61B 1/04* (2006.01)
  *A61B 90/00* (2016.01)

(52) U.S. Cl.
  CPC . *A61B 2034/2059* (2016.02); *A61B 2090/374* (2016.02)

(58) Field of Classification Search
  CPC ............ A61B 2090/374; A61B 90/361; A61B 2017/00707; A61B 2034/301; A61B 90/37; A61B 2034/2055; A61B 2018/00577; A61B 2034/2065; A61B 2090/363; A61B 2090/3937; A61B 2090/3954; A61B 34/20
  See application file for complete search history.

(56) References Cited

U.S. PATENT DOCUMENTS

| | | | | |
|---|---|---|---|---|
| 2008/0262345 | A1* | 10/2008 | Fichtinger | A61B 90/39 382/128 |
| 2009/0088634 | A1* | 4/2009 | Zhao | A61B 1/00193 600/425 |
| 2013/0066335 | A1 | 3/2013 | Barwinkel | |
| 2015/0005622 | A1 | 1/2015 | Zhao et al. | |
| 2019/0125446 | A1 | 5/2019 | Tyc et al. | |
| 2019/0154783 | A1 | 5/2019 | Kaditz et al. | |
| 2021/0145608 | A1* | 5/2021 | Herr | A61B 5/0082 |
| 2023/0106912 | A1* | 4/2023 | Kumar | A61B 34/30 600/411 |

OTHER PUBLICATIONS

International Search Report and Written Opinion received in PCT/US2021/025131 dated Jul. 8, 2021, 17 pages.
Muthupillai, R. et al., "Magnetic resonance imaging of transverse acoustic strain waves," Magnetic Resonance in Medicine, vol. 36, No. 2, pp. 266-274, 1996.
Streitberger, K.-J. et al., "In vivo multifrequency magnetic resonance elastography of the human intervertebral disk," Magnetic Resonance in Medicine, vol. 74, No. 5, pp. 1380-1387, 2015.
Walter, B. A. et al., "Mr elastography-derived stiffness: a biomarker for intervertebral disc degeneration," Radiology, vol. 285, No. 1, pp. 167-175, 2017.
Zheng, Y. et al., "Magnetic resonance elastography with twin drivers for high homogeneity and sensitivity," in 2006 International Conference of the IEEE Engineering in Medicine and Biology Society. IEEE, 2006, pp. 1916-1919.
Zheng, Y. et al., "Magnetic resonance elastography with twin pneumatic drivers for wave compensation," in 2007 29th Annual International Conference of the IEEE Engineering in Medicine and Biology Society. IEEE, 2007, pp. 2611-2613.
Mariappan, Y. K. et al., "Magnetic resonance elastography with a phased-array acoustic driver system," Magnetic Resonance in Medicine: An Official Journal of the International Society for Magnetic Resonance in Medicine, vol. 61, No. 3, pp. 678-685, 2009.
Neumann, W. et al., "Coupled actuators with a mechanically synchronized phase during mr elastography: A phantom feasibility study," Concepts in Magnetic Resonance Part B: Magnetic Resonance Engineering, vol. 48, No. 4, p. e21403, 2018.
Anderson et al., "Observation of direction-dependent mechanical properties in the human brain with multi-excitation mr elastography," Journal of the mechanical behavior of biomedical materials, vol. 59, pp. 538-546, 2016.
C. Stüer, et al., "Robotic technology in spine surgery: current applications and future developments," in Intraoperative imaging. Springer, 2011, pp. 241-245.
Roser et al., "Spinal robotics: current applications and future perspectives," Neurosurgery, vol. 72, No. suppl 1, pp. A12-A18, 2013.
A. Bertelsen, et al., "A review of surgical robots for spinal interventions," The International Journal of Medical Robotics and Computer Assisted Surgery, vol. 9, No. 4, pp. 407-422, 2013.
Overley et al., "Navigation and robotics in spinal surgery: where are we now?" Neurosurgery, vol. 80, No. 3S, pp. S86-S99, 2017.
Huang et al., "Spine surgical robotics: review of the current application and disadvantages for future perspectives," Journal of robotic surgery, vol. 14, No. 1, pp. 11-16, 2020.
Meinhold et al., "A direct drive parallel plane piezoelectric needle positioning robot for mri guided intraspinal injection," IEEE Transactions on Biomedical Engineering, 2020.
Lum, M. J. et al., "Teleoperation in surgical robotics-network latency effects on surgical performance," in 2009 Annual International Conference of the IEEE Engineering in Medicine and Biology Society. IEEE, 2009, pp. 6860-6863.
Hutchinson et al., "A tutorial on visual servo control," IEEE transactions on robotics and automation, vol. 12, No. 5, pp. 651-670, 1996.
Azizian et al., "Visual servoing in medical robotics: a survey. part i: endoscopic and direct vision imaging-techniques and applications," The international journal of medical robotics and computer assisted surgery, vol. 10, No. 3, pp. 263-274, 2014.
Azizian et al., "Visual servoing in medical robotics: a survey. part ii: tomographic imaging modalities—techniques and applications," The international journal of medical robotics and computer assisted surgery, vol. 11, No. 1, pp. 67-79, 2015.
Cortes, D. H. et al., "The shear modulus of the nucleus pulposus measured using magnetic resonance elastography: a potential biomarker for intervertebral disc degeneration," Magnetic Resonance in Medicine, vol. 72, No. 1, pp. 211-219, 2014.
Ben-Abraham et al., "Feasibility of MR elastography of the intervertebral disc," Magnetic resonance imaging, vol. 39, pp. 132-137, 2017.
Beauchemin et al., "Frequency-dependent shear properties of annulus fibrosus and nucleus pulposus by magnetic resonance elastography," NMR in Biomedicine, vol. 31, No. 10, p. e3918, 2018.
International Report on Patentability for International Application No. PCT/US2021/025131 dated Sep. 29, 2022.

* cited by examiner known: desired fiducial pixel coordinates, desiredFidCoords;
initialize: jog each robot axis and note corresponding change in image pixel coordinates to obtain numerical approximation of image Jacobian matrix, $J$;
normPixelError = large value;
while *normPixelError > 1* do
    Take MRI Image;
    pixelErrorVector = actualFidCoords − desiredFidCoords;
    normPixelError = ||pixelErrorVector||;
    Update Actuators by $J^\dagger$ pixelErrorVector;
end
 Algorithm 1: Imaged-Based Visual Servoing Control

*FIG. 5*

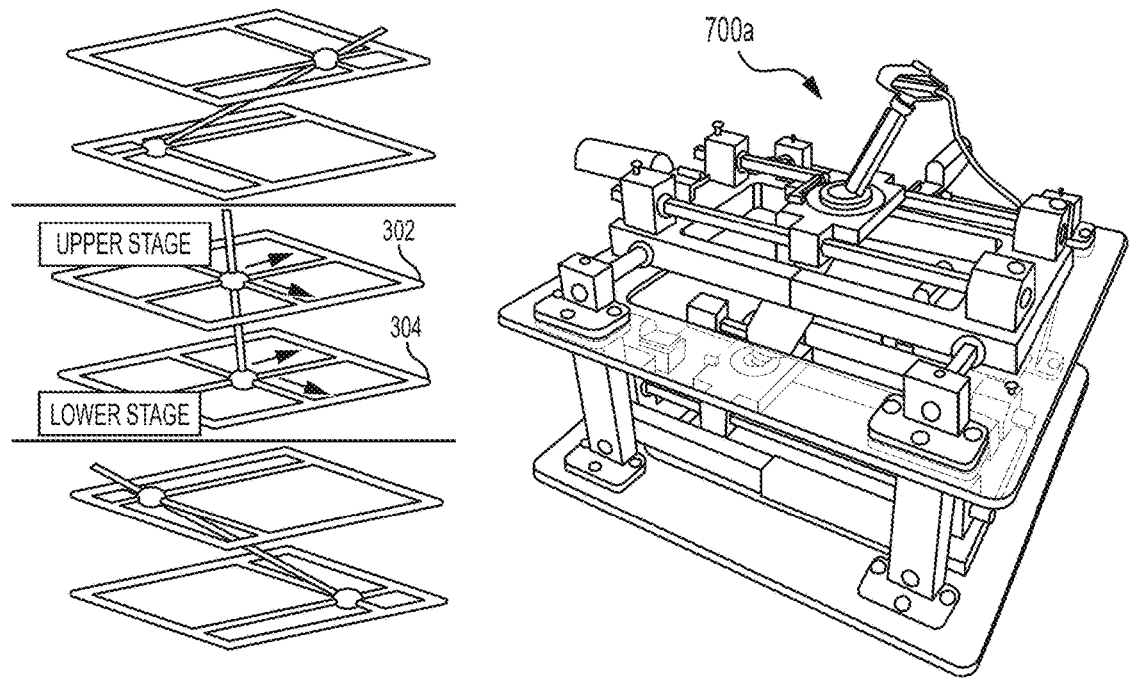
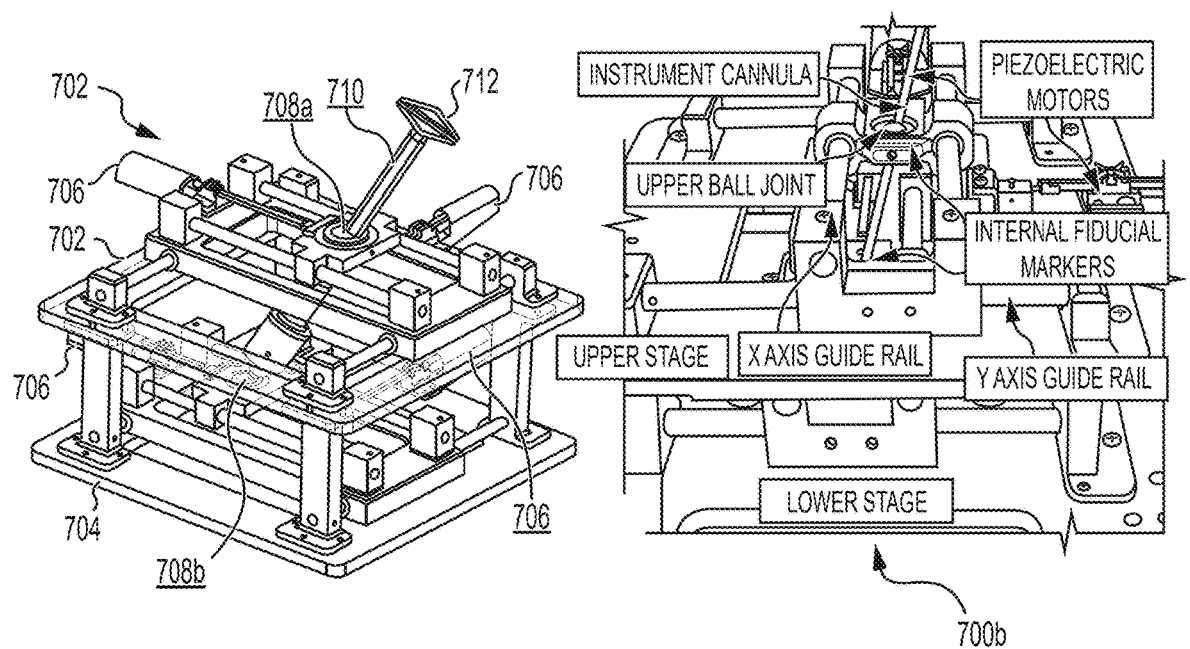
FIG. 7

5DOF Actuation System Evaluation

Simulation - MRE

EXPERIMENT - MRE

METHOD AND SYSTEM FOR GUIDING A POSITIONING INSTRUMENT

CROSS-REFERENCE TO RELATED APPLICATIONS

This application is a national stage application filed under 35 U.S.C. § 371 of PCT/US2021/025131 filed Mar. 31, 2021, which claims priority to, and the benefit of, U.S. Provisional Patent application No. 63/002,558, filed Mar. 31, 2020, entitled "System for Automated Magnetic Resonance Elastography Actuator Positioning," which is incorporated by reference herein in its entirety.

TECHNICAL FIELD

This disclosure relates to robotic controls and applications, particularly visual servoing controls, for MRI systems.

BACKGROUND

Magnetic resonance imaging (MRI) employs very strong magnetic fields to generate images of the internal organs in the body. These strong magnetic fields, which are strongest in the bore of the MRI scanner where a subject under study would be placed, poses technical challenges for the use of medical robots in MRI applications due to material compatibility issues in such high magnetic field. Medical robots are highly complex machines that employ numerous servo motors and greater number of sensors for close-loop feedback required such precision operation and are particularly prone to these material compatibility issues.

Visual servoing using endoscopic camera are currently being utilized in minimally invasive surgery, e.g., for biopsy, diagnosis, therapy, and prognosis, to control the movement of the endoscope holder arm to reduce medical errors. Visual servo (VS) control generally refers to the use of computer vision data to control the motion of a robot. The vision data are generally acquired from a camera that is mounted directly on a robot manipulator or on a mobile robot, in which case motion of the robot induces camera motion, or the camera can be fixed in the workspace so that it can observe the robot motion from a stationary configuration.

There is a benefit in improving servoing of medical robots, particularly for MRI systems.

SUMMARY

An exemplary robotic system and control method is disclosed that employs magnetic-resonance imaging (MRI) guided positioning of servo controls, via visual servoing, of a medical robot system. In an example, an MR Elastography (MRE) actuator system is disclosed that employs the exemplary MRI-guided visual servoing to assess tissues based on its mechanical properties. The exemplary MRI-guided positioning is directly and solely used as a feedback sensor through its visual output to control multiple degrees of movement of the MRE actuators. The exemplary MRI-guided positioning may be employed in various diagnostics, minimally invasive surgery, or medical procedures for any number of a medical instrument and interventional procedures that can be conducted in an MRI environment or in proximity to an MRI scanner.

In an aspect, a system is disclosed for guiding a positioning instrument, the system comprising a processor; and a memory having instructions stored thereon, wherein execution of the instructions by the processor cause the processor to continuously obtain data from an magnetic resonance imaging (MRI) scanner to provide visual feedback that guides movement of at least one actuator of the positioning instrument; determine a plurality of fiduciary landmarks on the positioning instrument using the continuously obtained data; determine a position and an orientation of a probe of the positioning instrument based on the determined fiduciary landmarks; and direct movement of the probe based on the determined position and orientation.

In some embodiments, the instructions to determine the plurality of fiduciary landmarks on the positioning instrument includes instructions to generate an image Jacobian of the continuously obtained data.

In some embodiments, the image Jacobian comprises a Jacobian matrix that relates actuator positions of the positioning instrument to a driver orientation of the positioning instrument.

In some embodiments, the image Jacobian comprises a single Jacobian matrix determined for the actuator positions of the positioning instrument.

In some embodiments, the continuously obtained data from the MRI scanner is used to provide visual feedback that guides movement of at least four actuators of the positioning instrument.

In some embodiments, the directed movement is performed to optimize an observed wave field in subsequent MRI images.

In some embodiments, the system further includes the positioning instrument, wherein the positioning instrument is configured to acquire measurements from a subject based on magnetic resonance elastography (MRE) imaging.

In some embodiments, the positioning instrument is configured as at least one of a biopsy instrument, a diagnostic instrument, an ablation instrument, a therapy insertion instrument, and an imaging instrument.

In some embodiments, the positioning instrument is configured to be placed proximal to the subject while the positioning instrument and the subject are positioned in a bore of the MRI scanner.

In some embodiments, the positioning instrument is configured to extend the probe toward a spinal region for spinal column imaging.

In some embodiments, the positioning instrument is integrated into a patient table of the MRI scanner.

In some embodiments, the positioning instrument is configured to be place on top of a subject while the positioning instrument and the subject are positioned in a bore of the MRI scanner.

In some embodiments, the data are continuously obtained, as 3D images, from a DICOM server of the MRI scanner.

In some embodiments, the system further includes a supplemental image capture device (e.g., camera, microscope, or endoscope) configured to continuously generate data to provide feedback to guide movement of at least one actuator of the positioning instrument.

In another aspect, a non-transitory computer readable medium is disclosed comprising instructions, wherein execution of the instructions by a processor cause the processor to continuously obtain data from an MRI scanner to provide visual feedback that guides movement of actuators of the positioning instrument; determine a plurality of fiduciary landmarks on the positioning instrument using the continuously obtained data; determine a position and an orientation of a probe of the positioning instrument based on the determined fiduciary landmarks; and direct movement of the probe based on the determined position and orientation.

In some embodiments, the instructions to determine the plurality of fiduciary landmarks on the positioning instrument includes instructions to generate an image Jacobian of the continuously obtained data.

In some embodiments, the image Jacobian comprises a Jacobian matrix that relates actuator positions of the positioning instrument to a MRE driver orientation.

In another aspect, a method is disclosed to guide a positioning instrument, the method comprising continuously obtaining image data from an MRI scanner to provide visual feedback that guides movement of at least one actuator of a positioning instrument; determining a plurality of fiduciary landmarks on the positioning instrument using the continuously obtained data; determining a position and an orientation of a probe of the positioning instrument based on the determined fiduciary landmarks; and directing movement of the probe based on the determined position and orientation.

In some embodiments, the step of determining the plurality of fiduciary landmarks on the positioning instrument comprises generating a Jacobian matrix that relates actuator positions of the positioning instrument to a MRE driver orientation.

In some embodiments, the obtained image data from the MRI scanner is used to provide visual feedback for at least one of a biopsy instrument, a diagnostic instrument, an ablation instrument, a therapy insertion instrument, and an imaging instrument.

In some embodiments, the positioning instrument is configured to extend the probe toward a subject for imaging, therapy, or incision to at least one body region of head, brain, spine, lungs, heart, kidney, spleen, breasts, muscle regions, skeletal muscle, stomach, small intestine, large intestine, bladder, colon, liver, knee, foot, ankle, hip, tendons, shoulder, elbows, fibrous ligament tissues, or a combination thereof.

In some embodiments, the steps includes performing a computer executed instruction to perform any operation recited in any one of claims 1-13.

In another aspect, a non-transitory computer readable medium is disclosed comprising instructions, wherein execution of the instructions by a processor cause the processor to perform any of operation recited above.

BRIEF DESCRIPTION OF THE DRAWINGS

The accompanying drawings, which are incorporated in and constitute a part of this specification, illustrate embodiments and together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIG. 5 shows an example algorithm for the MRI-guided visual servoing in accordance with an illustrative embodiment.

FIG. 7 shows an example MRI robot system configured as 2-stage 5DOF actuator system for magnetic resonance elastography measurements in accordance with an illustrative embodiment.

DETAILED SPECIFICATION

Figure 1:
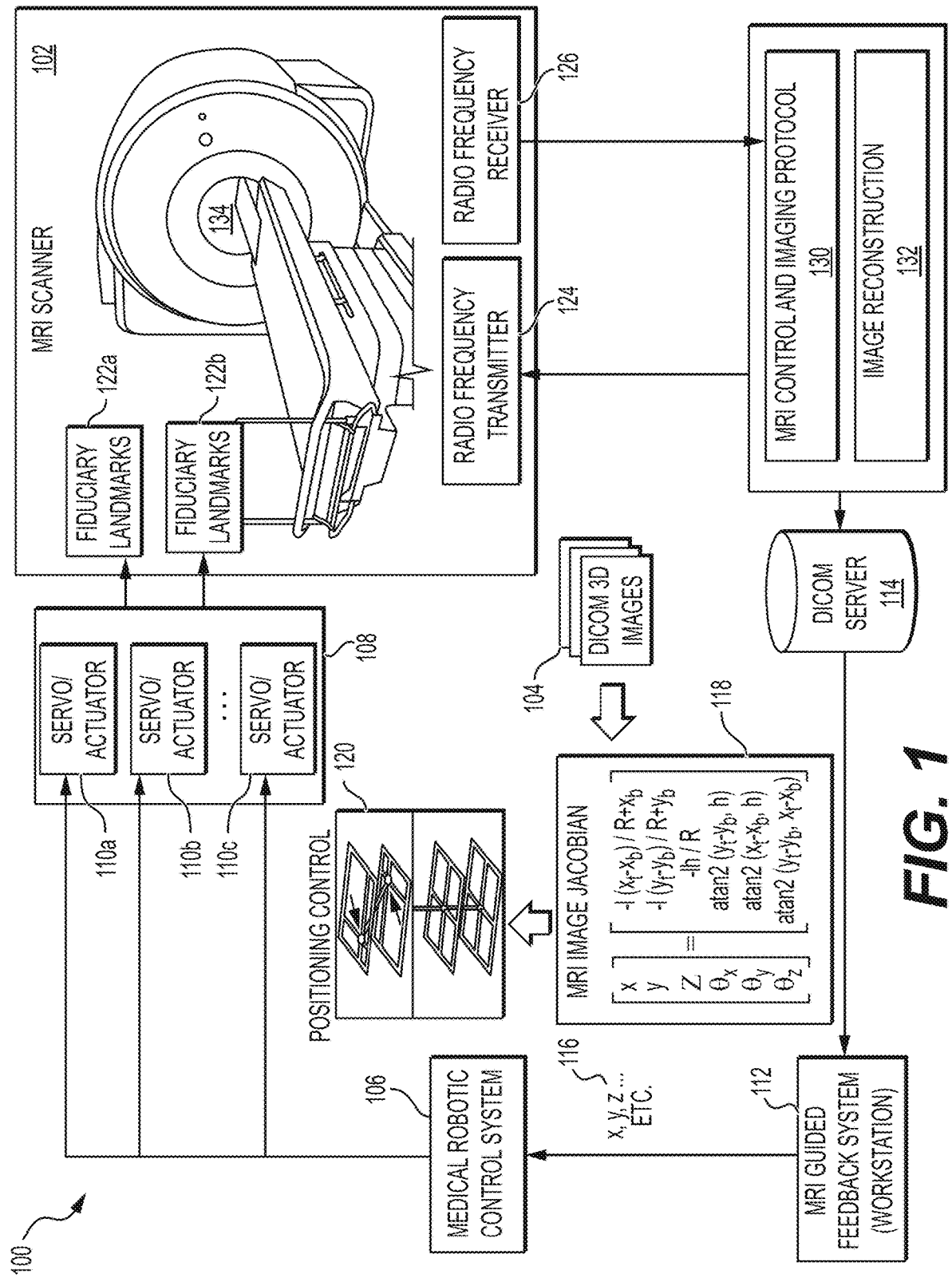
FIG. 1 is a diagram showing an example MRI-guided visual servoing system in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. For example, [41] refers to the 41st reference in the list. All references cited and discussed in this specification are incorporated herein by reference in their entireties and to the same extent as if each reference was individually incorporated by reference.

Example System

FIG. 1 is a diagram showing an example MRI-guided visual servoing system 100 in accordance with an illustrative embodiment. In FIG. 1, an MRI scanner 102 is used to generate (e.g., continuously generate) MRI images 104 (shown in FIG. 1 as "Dicom 3D Images" 104) that are provided as feedback to a controller 106 (shown as "Medical Robot Control System" 106) of an MRI medical robot 108 comprising one or more actuators 110 (shown as "servo/actuators" 110a, 110b, and 110c) to direct or guide their movements. An MRI-guided feedback module 112 receives the MRI images 104 from the MRI scanner 104, e.g., from a Dicom server 114. The MRI-guided feedback module 112 executes Jacobian inverse control operation using the MRI images 104 to provide position measurements 116, e.g., endpoint position measurements. The position measurements may be based on spatial positions, orientation, angular orientation or placement, relational spatial or angular positions with respect to a reference frame or location, as well as velocity, acceleration. The MRI medical robot 108 include fiduciary landmarks 122 (shown as 122a, 122b, etc.) that is located, in some embodiments, on components of the MRI medical robot 108 that is in the MRI visual field. The fiduciary landmarks 122, in some embodiments, are placed on a subject as well.

The MRI-guided feedback module 112 generates an MRI image Jacobian 118 from an image coordinate frame extracted (determined) from the MRI images 104 using the fiduciary landmarks 122. The MRI image Jacobian 118 is used to translate the image frame to the robot control frame for the robot positioning control 120. The continuously obtained data (e.g., 104) is used to provide visual feedback that guides movement to at least one actuator of the positioning instrument of the MRI medical robot 108. In some embodiments, for an N degree-of-freedom actuation system, a N-dimensional Jacobian may be used. In some embodiments, the MRI image Jacobian is numerically estimated for a set of actuate-able positions.

The MRI-guided feedback module 112 may be used solely in some embodiments. In other embodiments, the MRI-guided feedback module 112 is used in combination with other visual servoing operations, e.g., from an external camera or endoscope (not shown).

The MRI image Jacobian 118, in some embodiments, is a Jacobian matrix that relates actuatable positions (e.g., of the positioning instrument of the MRI medical robot 108 or a position-able instrument fixably attached or grasped by the MRI medical robot 108) to a driver orientation of the positioning instrument. In some embodiments, the image Jacobian 118 comprises a single Jacobian matrix determined for the actuator positions of the positioning instrument. In other embodiment, two or more image Jacobians 118 may be used to translate the image frame to the robot control frame for the robot positioning control 120.

MRI images 104 may include raw Dicom images as generated from the MRI scanner 102. In some embodiments, the images may be translated to other standard prior to be processed by the MRI-guided feedback module 112. MRI images 104, in some embodiments, may include models derived, or generated from Dicom images, other images, or other MRI data set, e.g., k-space data, that are generated by the MRI scanner 102. The MRI images 104 are evaluated to extract fiduciary landmarks 122. In some embodiments, the MRI images 104 are further evaluated to extract other landmarks defined by the body structure, skeletal structures, organ boundaries, or any other segment-able features in the image.

The medical robot control system 106 may include a computing device (e.g., workstation) and/or any instrumentations and hardware to control the MRI medical robot 108. In some embodiments, the workstation/computing device also executes the MRI-guided feedback module 112. In other embodiments, multiple workstations may be used and are connected over a direct communication link or network. The medical robot control system 106 may solely operate the MRI medical robot 108. In some embodiments, the MRI medical robot 108 is configured to operate with conjunction with other controllers or control system of a submodule or components used in conjunction with the MRI medical robot 108.

MRI medical robot 108 may include biopsy instrument, a diagnostic instrument, an ablation instrument. In some embodiments, MRI medical robot 108 is configured as an MRE actuation system. In some embodiments, MRI medical robot 108 is configured an MRI-based needle injection system. An example of the MRE actuation system is described herein. An example of an MRI-based needle injection system is described in Waiman Meinhold, Daniel Enrique Martinez; John Oshinski, Ai-Ping Hu, Jun Ueda, "A Direct Drive Parallel Plane Piezoelectric Needle Positioning Robot for MRI Guided Intraspinal Injection," IEEE Transactions on Biomedical Engineering (Volume: 68, Issue: 3, March 2021), which is incorporated by reference herein in its entirety.

Actuator 110 may be a servo motor or actuation component such as a piezoelectric actuator, stepper motor, brush motor, brushless DC motor, gearmotor, mechanical actuator, pneumatic actuator, and drive. In some embodiments, the actuators are MRI compatible and are configured to operate in the presence of high magnetic field, e.g., within the bore of an MRI scanner. In other embodiments, the actuators are MRI compatible and are configured to operate outside the bore of the MRI scanner.

MRI scanner 102, in some embodiments, and as shown in FIG. 1, may include radio frequency transmitter 124, a radio frequency receiver 126, a controller 128 (shown as "MRI control and imaging protocol" 130, and processing unit 132 (shown as "Image reconstruction" 132). The MRI control and imaging protocol module 130 is configured to control the radio frequency transmitter 124 and to receive acquired measurements from the radio frequency receiver 126. The radio frequency transmitter 124 generates radio pulses waves that are introduced into a gradient magnetic field generated by gradient coils and magnets (not shown) of the MRI scanner 102. The gradient magnetic field of the scanner causes protons of hydrogen atoms to spin or align to the applied field, and the radio pulse waves cause the protons to absorbed energy change its alignment or spin. When the RF pulse stops, the protons release the absorbed energy and return to their previous alignments and, in so doing, emit a RF signal that is received by the radio frequency receiver 126. In many MRI scanners 102, the radio frequency transmitter 124 and radio frequency receiver 126 are integrated into a single set of RF coils. The received RF signals are processed by the image reconstruction module 132, which is often a workstation located in the scanner 102. The image reconstruction module 132 may generate Dicom images that are stored in Dicom server 114.

An example MRI-guided visual servoing is described herein for a magnetic resonance elastography (MRE) actuation system, though the example MRI-guided visual servoing may be used with any MRI instrument, for example, but not limited, a biopsy instrument, a diagnostic instrument, an ablation instrument, a therapy insertion instrument, and an imaging instrument.

In an example MRE actuation system, one or more of its positioning instrument may be guided or directed by the MRI-guided visual servoing. The directed movement, e.g., based on MRI-guided visual servoing can be optimized for an observed wave field in subsequent MRE images. The example magnetic resonance elastography includes 5 degree-of-freedom (DOF).

Example Method of Operation for MRI Visual Servoing

Figure 2:
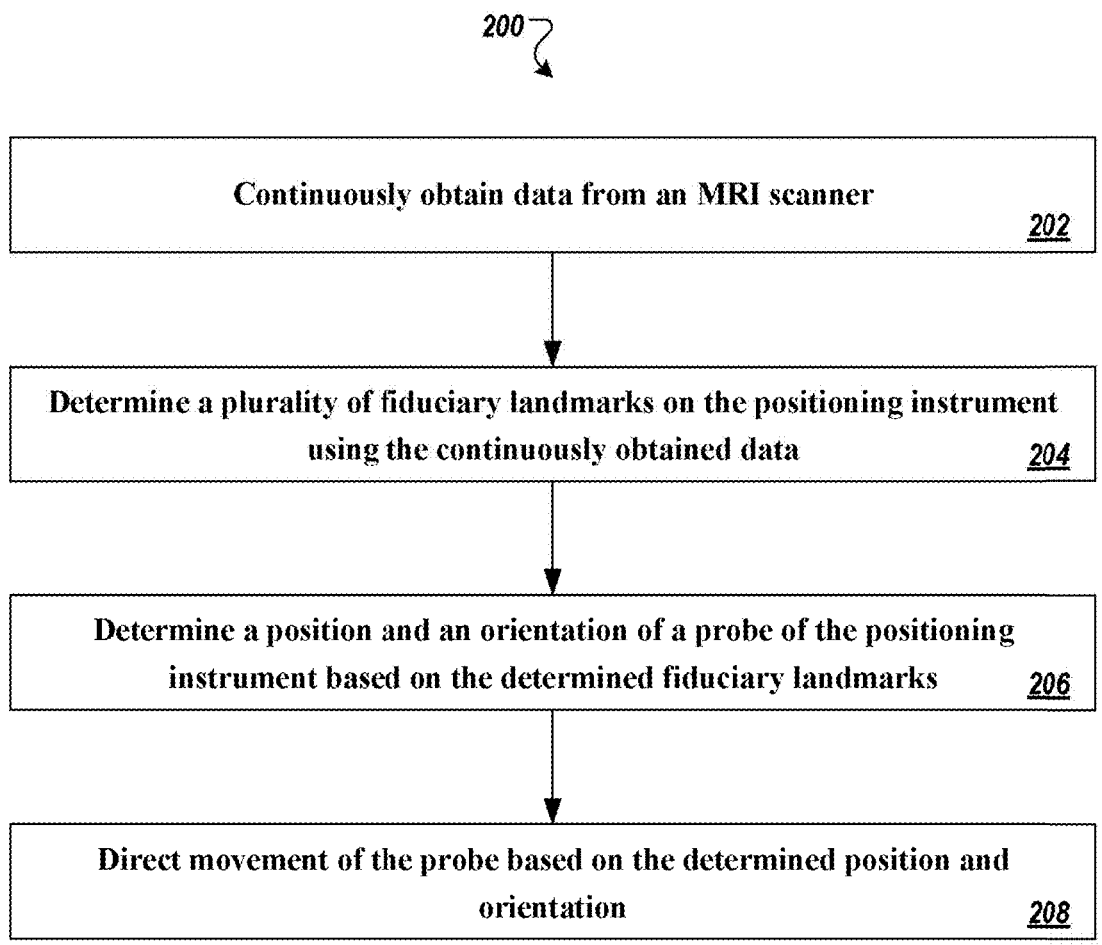
FIG. 2 shows a method to perform MRI visual servoing for guiding a positioning instrument in accordance with an illustrative embodiment.

FIG. 2 shows a method 200 to perform MRI visual servoing for guiding a positioning instrument in accordance with an illustrative embodiment. A positioning instrument may include an MRI medical robot 108. The method 200 includes continuously obtaining (202) data (e.g., Dicom 3D images or other MRI images 104) from an MRI scanner to provide visual feedback to be used to guide movement of at least one actuator (e.g., 110) of the positioning instrument (e.g., 108).

The method 200 includes determining (204) a plurality of fiduciary landmarks (e.g., 112) on the positioning instrument (108) using the continuously obtained data (e.g., Dicom 3D images or other MRI images 104). In some embodiments, the probe comprises a sensor/transducer, e.g., for a MRE system. In some embodiment, the probe comprises an ablation system (e.g., laser), incision, endoscopic camera. In some embodiments, the probe comprises a needle and fluid injection system.

The method 200 includes determining (206) a position and an orientation (e.g., 116) of a probe of the positioning instrument based on the determined fiduciary landmarks. In some embodiments, Jacobian inverse control is used, with visual feedback from the MRI images. The visual feedback is used to provide endpoint position measurements where a single actuator is used to control each degree-of-freedom of control. An image Jacobian matrix may be used to relate small displacements of the actuators to motion of the fiducials.

Image Jacobian Matrix.

The Jacobian matrix may be directly derived from the image coordinate frame, and as the transformation between robot frame and image frame may not be known a priori. That is, the boundaries may be defined by moving numerically evaluating the positions of a point of interest (e.g., the probe or point to contact the subject) along its allowable ranges as defined within the mechanical system. For analysis and evaluation purposes, the kinematic Jacobian was computed by differentiating an image Jacobian matrix as shown in Equation 1.

$$J = \frac{\partial C}{\partial M^T} \quad \text{(Equation 1)}$$

In Equation 1, C is a DOF configuration of the medical robot fiducial markers in the image (camera) space, and M represents the actuator (e.g., motor) positions in the robot space. An example of the Jacobian matrix is shown in Equation 2.

$$\begin{bmatrix} x \\ y \\ z \\ \theta_x \\ \theta_y \\ \theta_z \end{bmatrix} = \begin{bmatrix} -l(x_t - x_b)/R + x_b \\ -l(y_t - y_b)/R + y_b \\ -lh/R \\ a\tan2(y_t - y_b, h) \\ a\tan2(x_t - x_b, h) \\ a\tan2(y_t - y_b, x_t - x_b) \end{bmatrix} \quad \text{(Equation 2)}$$

In Equation 2, coordinates x, y, and z refer to respective x, y, z coordinate locations for the probe of interest, coordinates $x_t$ and $y_t$ refer to the robot's actuator positions along the X and Y axis along a first controllable stage (e.g., top stage), and $x_b$ and $y_b$ refer to the robot's actuator positions along the X and Y axis along a second controllable stage (e.g., bottom stage). The insertion depth or displacement of the probe 306 of the needle from the center of the lower ball joint, l, the height between planes h, is 53 mm. The variables x; y; and z describe the position of the needle in the global fixed frame, while $\theta_x$, $\theta_y$, and $\theta_z$ describe the orientation of the probe in the global coordinate frame.

For a 5 DOF system, the fiducial marker coordinates C may be defined as $[C_x\ C_y\ C_z\ C_{\theta x}\ C_{\theta y}]^T$, and the actuator positions M may be defined as $[M_{xt}\ M_{yt}\ M_{xb}\ M_{yb}\ M_l]^T$. When the fiducials are rigidly mounted to a connecting rod axis of the actuation system, the Jacobian matrix may also relate the actuator positions to the MRE driver orientation. Although a single endpoint mounted fiducial can be used to measure C, multiple configurations or combinations of fiducials may be used to construct C Image Jacobians with varying attributes may be used. The mapping between the robot space and image space may be contained within the image Jacobian so any relative orientations when the system has multiple control planes are immaterial to the positioning protocol. The image Jacobian matrix may include elements that are not used in the subsequent positioning operation.

The image Jacobian matrix may be updated so changes in magnitude may be registered for configuration of various control planes or geometries. The image Jacobian matrix may be defined so the signs in the matrix do not changes. The image Jacobian matrix-based control operations may be updated to converge to a target position.

The method 200 includes directing (208) movement of the probe based on the determined position and orientation. In some embodiments, the image Jacobian matrix relates actuator positions and the changes in position and orientation of the driver of the MRI medical robot (e.g., 108). In some embodiments, the image Jacobian matrix is generated such that the values therein are numerically (or empirically) estimated for the full range of motion by the MRI medical robot. In some embodiments, the estimation may be determined for components in which its relative positioning defines endpoint location and actuator orientation of interest.

Figure 3A:
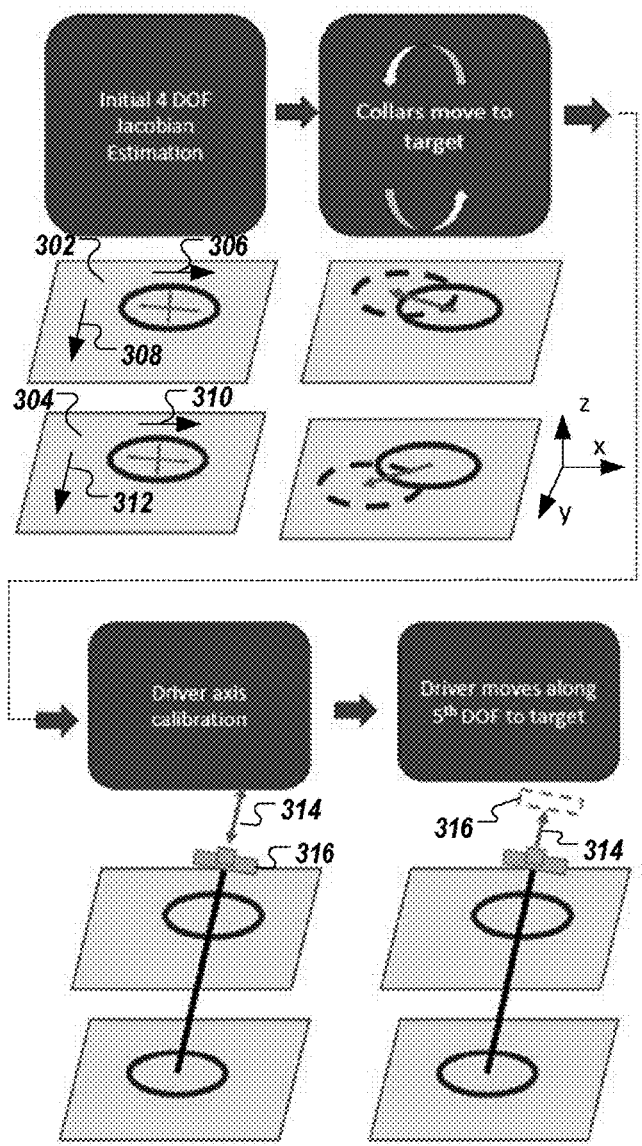
FIG. 3A shows an example control operation to direct movement of a probe for a 5-DOF actuation system in accordance with an illustrative embodiment.

FIG. 3A shows an example control operation to direct movement of a probe for a 5-DOF actuation system comprising 2 stages of movements, as, for example, described by Equation 1. The operations of FIG. 3A shows the initial configuration of the image Jacobian matrix. The operations of FIG. 3A may be performed once, intermittently (e.g., with each boot-up), or continuously. Each of the upper and lower stages (shown as 302, 304) provides two degree-of-freedom of movement in the x and y directions (shown as 306, 308, 310, and 312) to provide 4 DOF. The fifth DOF is a displacement (shown as 314) of shaft that houses a probe at its tip (316).

In FIG. 3A, the movement space of the 5-DOF actuation system comprising 2 stages of movements mirrors a two-parallel plane actuation system in which each plane is coupled by ball joint collar to provide controllable movement with a 4 DOF Jacobian matrix (or submatrix) to move the ball joint collar to a target position to provide the 4 DOF movements. A driver axis actuator, controlled by the $5^{th}$ DOF, can be advanced or extracted to move a driver into contact with, and away from, the subject. This process can be used to effectively to position the driver in close proximity to the final target position (which may be at the target surface or below the surface). If an additional parameters is added for servoing (e.g., to maximize the displacement field in a specific ROI), a 5DOF Jacobian can be estimated and used for small adjustments near the initial target. Indeed, higher order Jacobian matrices may be generated.

Figure 3B:
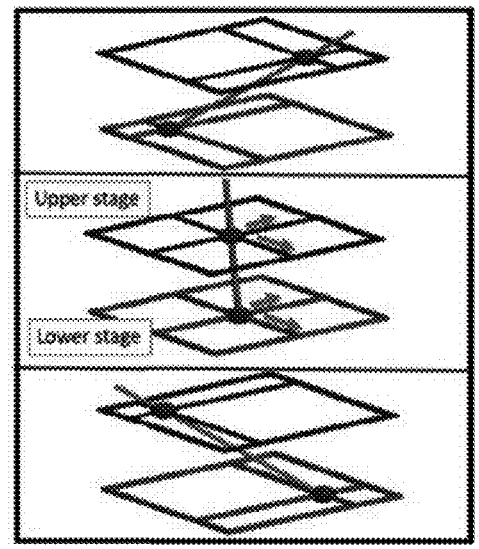
FIG. 3B shows the controllable movement for the 5-DOF actuation system of FIG. 3A in accordance with an illustrative embodiment.

FIG. 3B shows the controllable movement for the 5-DOF actuation system of FIG. 3A in accordance with an illustrative embodiment. The 5-DOF actuation system may be configured as a MRE system. In some embodiments, the 5-DOF actuation system is configured as an ablation system (e.g., laser), incision, endoscopic camera. In some embodiments, the 5-DOF actuation system is configured a needle and fluid injection system.

The 5-DOF actuation system is configured, in some embodiments, for sub-mm motions within the MR environment. In addition, the system employ a high frequency actuator as well as an imaging and control scheme that facilitate position control and image analysis in near-real-time.

Example Image Jacobian Matrix Generation

Figure 3C:
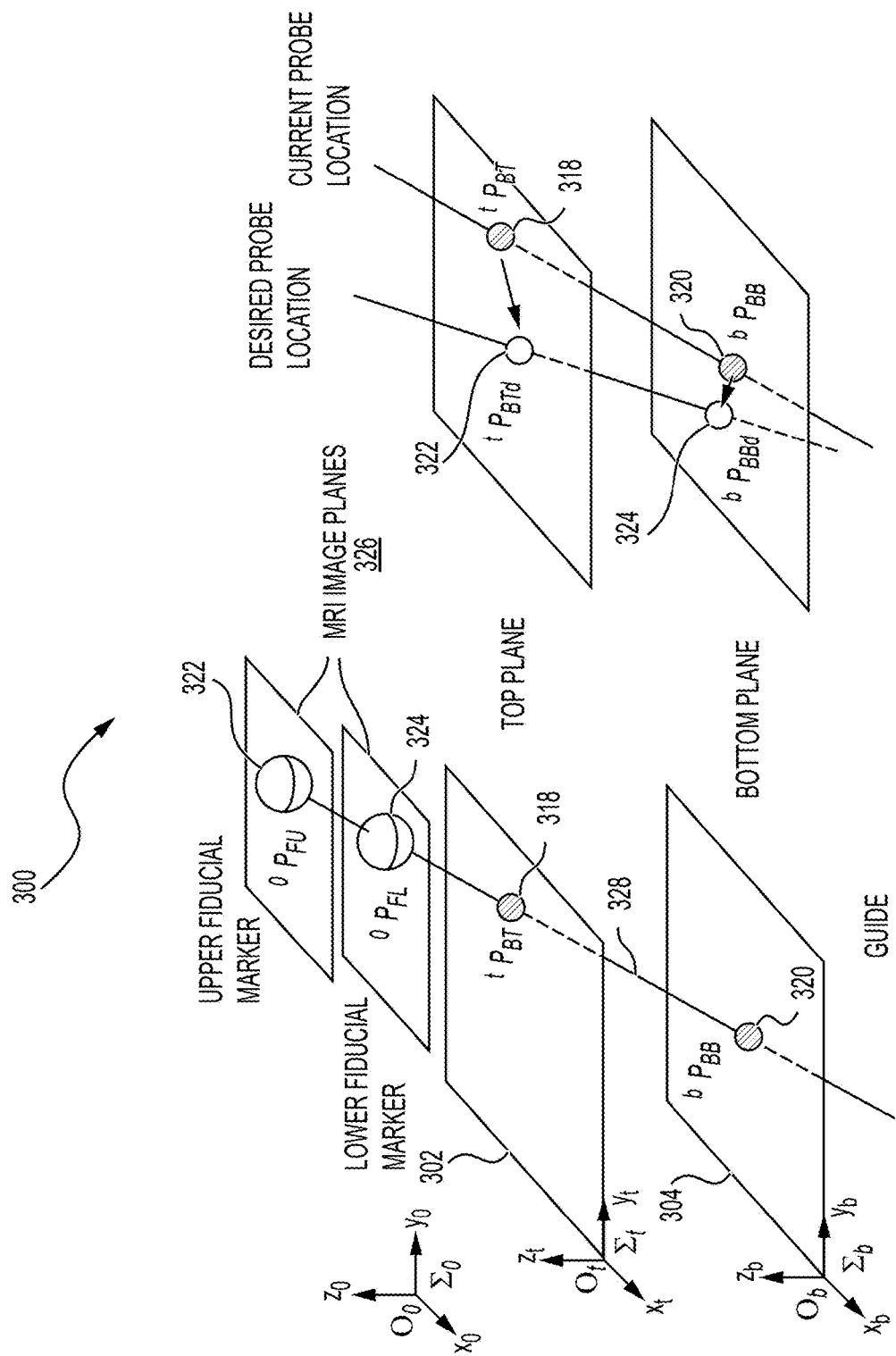
FIG. 3C shows an example method to configure an MRI image Jacobian in accordance with an illustrative embodiment.

FIG. 3C shows an example method to configure an MRI image Jacobian in accordance with an illustrative embodiment. The MRI image Jacobian matrix may be generated based on kinematic analysis. Let $$^t p_{BT} = \begin{bmatrix} x_t \\ y_t \end{bmatrix}$$

be a position 318 on the first stage 302 with respect to the coordinate frame as shown in FIG. 3C. Similarly, let $$^b p = \begin{bmatrix} x_b \\ y_b \end{bmatrix}$$

be a position 320 on the second stage 302ith respect to the coordinate frame where $x_t$, $y_t$, $x_b$, and $y_b$ are displacement positions for an actuator system. Defining $$^t P^{BT} = \begin{bmatrix} x_t \\ y_t \end{bmatrix} \text{ and } ^b P = \begin{bmatrix} x_t \\ y_t \end{bmatrix},$$

the homogenous transformation for the current probe positions may be defined per Equation 3 to provide the positions 318, 320 with respect to the base coordinate frame $\Sigma$ where $T_t$ and $T_b$ are the homogenous transformation matrices. The coordinate frame for the first and second stage may be defined as $\Sigma_t$ and $\Sigma_b$.

$$P_{BT} = T_t{}^t P_{BT}$$

$$P = T_t{}^t P \quad \text{(Equation 3)}$$

In FIG. 3C, two fiducial markers 322, 324 (also generally referred to as fiduciary landmarks herein) attached to the probe 316 are shown being used to facilitate the detection of the 4-DOF positions and orientations. The fiducial markers 322, 324, in some embodiments, comprises a polymer shell that forms a spherical cavity and filled with Vitamin E to be detectable by the MRI system. The fiducial markers 322, 324 appear as circular objects in the MRI images. A circle detection algorithm may be used on each given image slice (shown as 326) that returns the location of the fiducial marker 322, 324 within the image 326. The 4-DOF positions and orientations can then be calculated from the locations of the two markers 322, 324. Measurement of position of the fiducial markers $P_{FU}$ and $P_{FL}$ can be used to determine a line 328 along the probe guide. The intersections 318, 320 between the line 328 and each of the x-y plane of $\Sigma t$ and $\Sigma b$ (302, 304) can then define the joint positions of the actuator system. While the fiducial markers 324, 326 are illustrated to be both located above the top stage 302, the fiducial markers 324, 326 may be located anywhere on the actuator system, e.g., above, along, and between the two stages 302, 304.

Matching $P_{BT}$ and $P$ (Equation 3) with a desired probe position $P_{BT_d}$ and $P_{BB_d}$ (330, 332) solves the inverse kinematics. Because the two stages can operate independently from each other, more than one solution can exist and does exist where $P_{BT}$ and $P$ exist (e.g., unless the probe is not completely orthogonal to the parallel planes). The image-guided positioning may be performed in in iterative manner.

Example Control Operation Using MRI-Guided Visual Servoing

Figure 4:
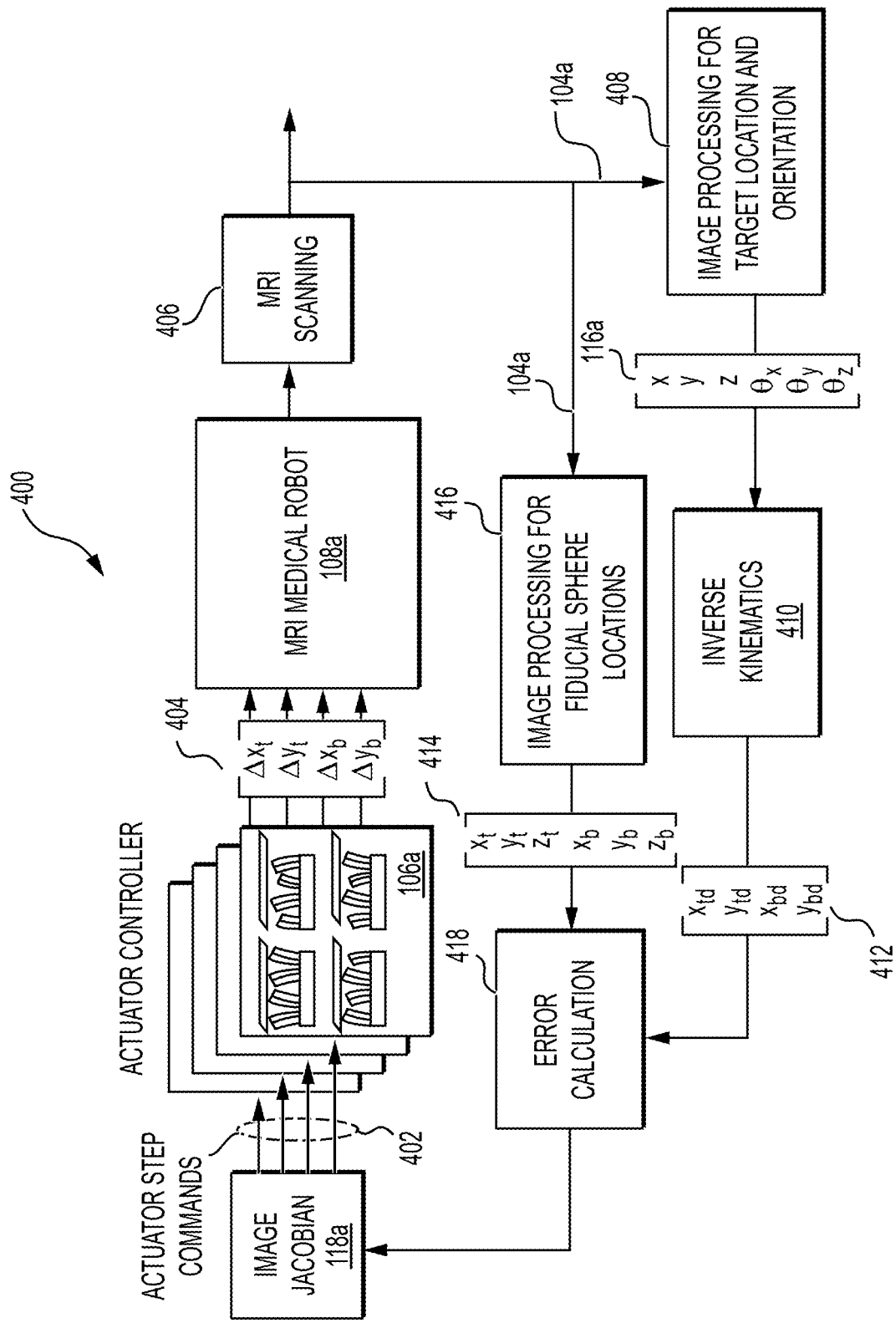
FIG. 4 shows an example control operation using MRI-guided visual servoing for an MRI medial robot in accordance with an illustrative embodiment.

FIG. 4 shows an example control operation 400 using MRI-guided visual servoing for an MRI medial robot 108 (shown as 108a) in accordance with an illustrative embodiment. in FIG. 4, an MRI image Jacobian 118 (shown as 118a) is generated and is used (402) to provide actuator step commands to the medical robot control system 106 (shown comprising a plurality of actuator controllers 106a). In FIG. 4, the actuator controllers 106a provide control signals 404 to the MRI medical robot 108a. In this example, the control signals 404 (shown as $\Delta x_t$, $\Delta y_t$, $\Delta x_b$, $\Delta y_b$) comprises changes in x-position and y-position of each of the two stages of the MRI medical robot 108a. The MRI scanner 102 (not shown) generates (406) MRI scanning of the subject and a portion of the MRI medical robot 108 comprising the fiduciary landmarks 122. The image reconstruction module (e.g., 132) performs (408) imaging processing to provide MI images 104 (shown as 104a) for target locations and orientations to provide coordinate locations 116 (shown as 116a for this example as x, y, z, $\theta_x$, $\theta_y$, and $\theta_z$ as described in relation to Equation 2) for the probe of interest. The coordinate locations 116a are solved via an inverse kinematic operations, e.g., as described herein, to generate the desired probe position $P_{BT_d}$ and $P_{BB_d}$ 412 (shown as $x_{td}$, $y_{td}$, $x_{bd}$, and $y_{bd}$). The current probe positions $P_{BT}$ and P 414 (shown as $x_t$, $y_t$, $x_b$, and $y_b$) are determined (416) by image processing operation for fiduciary landmarks in the MRI images 104

(shown as 104a). The control loop 400 calculates (418) error between the current probe positions $P_{BT}$ and P 414 and the desired probe position $P_{BT_d}$ and $P_{BB_d}$ 412 to generate the MRI image Jacobian 118a. In some embodiments, to compute the image Jacobian 118a, three points are used (e.g., a central origin, a first movement in the x-axis, and a second movement in a y-axis). The points may be chosen to isolate the x and y actuator movements of the robot if positioned approximately paralleled to the image coordinate plane.

FIG. 5 shows an example algorithm for the MRI-guided visual servoing in accordance with an illustrative embodiment. As shown in FIG. 5, visual servoing control uses image information to actuate the robot's axes to drive the observed fiduciary landmark error to zero. The method does not require sensor calibration and can assume no a priori knowledge of the robot kinematics. The desired fiducial coordinates may be obtained by manually actuating the robot axes to effect the desired orientation and positioning of the probe of interest with respect to the target of interest on the subject.

Example Implementation of MRI-Guided Visual Servoing

Figure 6:
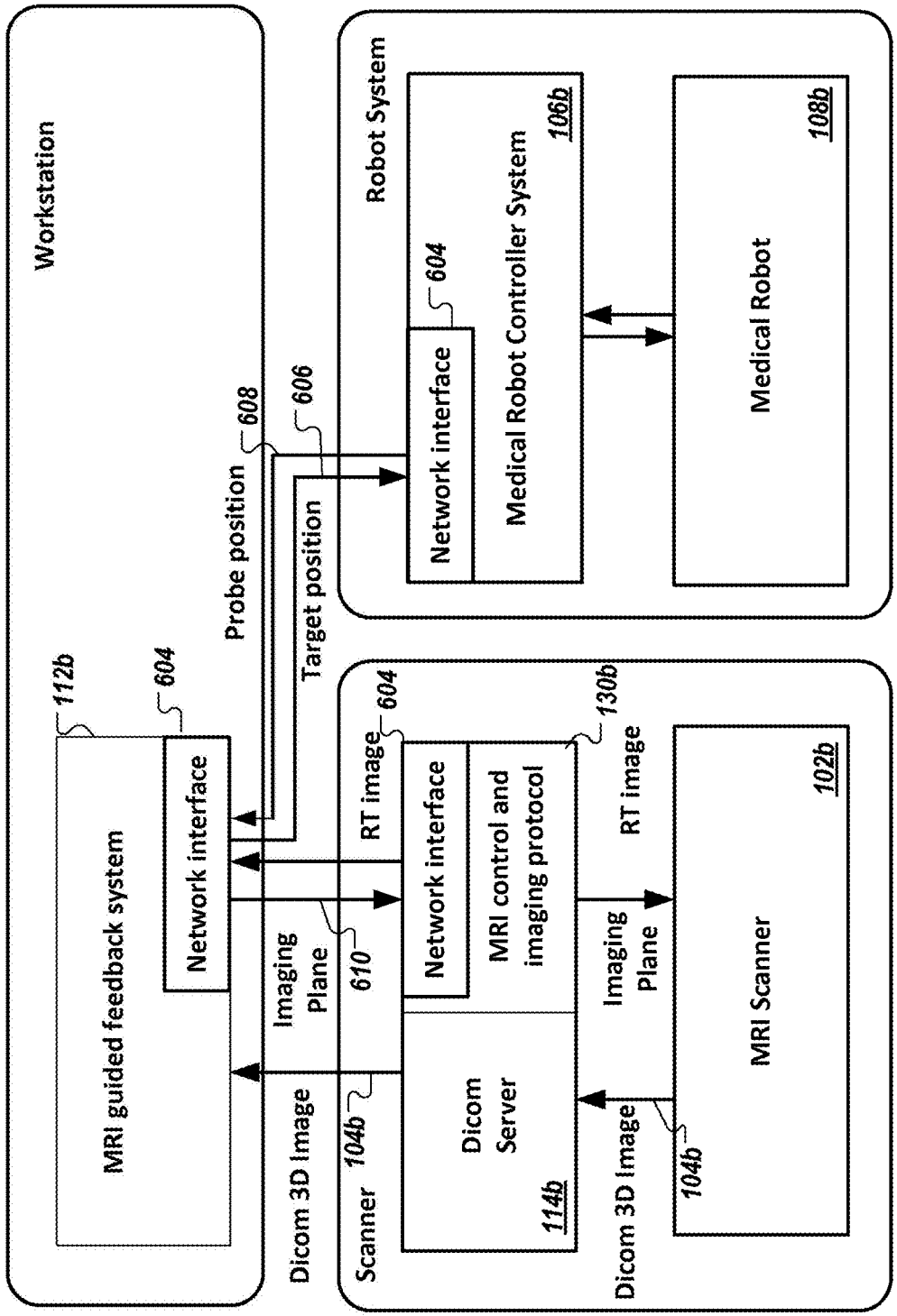
FIG. 6 shows an example implementation of an MRI-guided visual servoing in accordance with an illustrative embodiment.

FIG. 6 shows an example implementation of an MRI-guided visual servoing in accordance with an illustrative embodiment. As shown in FIG. 6, the MRI scanner 102 (shown as 102b) is used to generate MRI images 104 (shown as "Dicom 3D images" 104b) to MRI-guided feedback module 112 (shown as 112b) comprising a workstation executing navigation software 602. The MRI-guided feedback module 112 employs a network interface 604 (e.g., OpenIGTLinks) to (i) communicate target positions 606 to, and probe positions 608 from, the medical robot control system 106 (shown as "Robot Controller" 106b) and (ii) communicate imaging planes of interest 610 to, and 3D images 104b from, the Dicom server 114 (shown as 114b) and the MRI control and imaging protocol module 130b of the MRI scanner 102b. The network interface 604 may be an extensible peer-to-peer network protocol for image-guided therapy (IGT) such as OpenIGTLink. The network interface 604 may facilitate the display of preoperative 3D image allowing clinician to select targets of interest, the capture of semi-real-time wave field images for guiding a procedure, and the automatic and optimal positioning of the MRI robot system 108 (shown as 108b). The network interface (e.g., OpenIGTLink protocol) may be used to exchange various types of data including commands to the robot and scanner and semi-real-time images.

Example MRI Robot System—2 Stage 5DOF Actuation System

FIG. 7 shows an example MRI robot system 108 configured as 2-stage 5DOF actuator system 700, e.g., for magnetic resonance elastography measurements. In FIG. 7, two prototypes are shown as 700a and 700b. The description is provided with respect to a CAD model 702 of the prototype 700a, though is applicable to that of the prototype 700b as well. The 2-stage 5DOF actuator system 700 is fixed platform is made out of two parallel stages distanced by rectangular pillars in between. The system 700 includes a top stage actuation plane assembly 702 (corresponding to stage 302) and a bottom stage actuation plane assembly 704 (corresponding to stage 304). Each stage 702,704 includes a 2-axis guide rail assembly coupled to respective linear piezoelectric direct drive actuators/motors 706 and is configured to move a ball-joint assembly 708 (shown as 708a, 708b), housed within identical carriers, along an x and y positions. The ball-joint assemblies 708a, 708b are joined by an instrument cannula 710 that includes a MRE probe 712 at its terminal end.

Low surface friction rods may be used as carrier guides. Inside the x-axis carriers, a ring-shaped volume may be left empty for contrast agent to be injected. The linear positioning of all the carriers may be performed by hydraulic manipulators (syringe-tube-syringe system). As the mechanical vibration source, an MR compatible piezo actuator (e.g., APA150M-NM, manufactured by Cedrat Technologies) may be used. This actuator may be attached to the tip of a rod piece (cannular) which is passed through the upper spherical ball joint. The other end of the rod piece is coupled with a syringe that serves as the 5th DOF linear positioner. Inside this rod piece, a fiducial marker may be placed close to the tip in which the piezo actuator is attached. While the upper spherical ball joint serves as a guide for this rod piece, the lower spherical ball joints may hold the syringe tube casing which can provide the 5th DOF linear motion.

The MRI robot system 700 may use the MRI-guided visual servoing for positioning of instruments and interventional tools, such as for automated actuation and positioning for magnetic resonance elastography (MRE). The system is configured to provide parallel plane mechanism comprising planar movements of fiducials, as well as the piezoelectric direct drive, that is uniquely suited for accurate and fast visual servo control.

Experimental Results for MRI-Guided Visual Servoing and Additional Examples

A study was conducted to evaluate the MRI-guided visual servoing in an MRI medical robot application. Several MRI robots were fabricated as assessed in the study, including MRI robots 700a, 700b.

Design. The MRI-guided visual servoing system was evaluated (using prototype 700a and 700b) in the study, including for precision and positioning speed. To reduce both image collection and processing time, a parallel plane configuration for positioning two ball joints was chosen for the prototype. For prototype 700b, the two ball joints were joined by a brass cannula. This tube can be positioned with 4 degrees of freedom, one for each of the actuators. The actuators used are linear piezoelectric motors (PiezoLegs6N, MicroMo), with a 6-micron step size. MR safety of the robot and actuators was assessed by imaging of a cylindrical phantom in a 3T MRI scanner (Siemens Trio) and calculation of the SNR with and without the robot.

Fabrication.

The MRI robot 700b was fabricated using 3D printing and conventional milling Materials are primarily nylon, ABS and PLA, with a small number of titanium fasteners. Each axis is guided by Garolite rods. The prototype 700b includes two ball joints that are joined by a brass cannula. The tube can be positioned with 4 degrees of freedom, one for each of the actuators.

Control.

For all experiments, the MRI robots 700b (as well as MRI robot 700a) employed MRI-guided visual servoing. The control method employed estimation of the image Jacobian from in-plane fixed step movements, and error calculation from each successive image to compute the necessary actuator commands, e.g., as described in relation to FIG. 4.

Positioning Experiments and Results.

Positioning (for verification) of the robot controls for prototype 700b was measured using both an external camera (Intel Realsense 415C, 100-micron resolution as configured) and a laser triangulation sensor (MicroEpsilon, ILD2200-20, 6-micron linearity). Repeatability and accuracy of plane positioning were both measured. Performance of the system in the MRI scanner was also tested, with vitamin E filled internal cavities serving as fiducials for visual feedback.

Figure 8A:
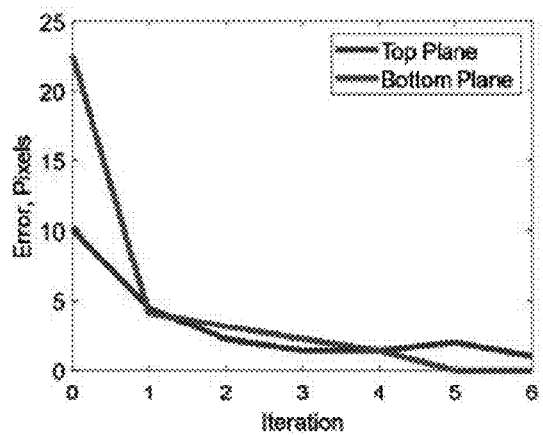
FIG. 8A shows experimental results of an MRI-based visual servoing system compared to a camera-based positioning control system in accordance with an illustrative embodiment.
Figure 8B:
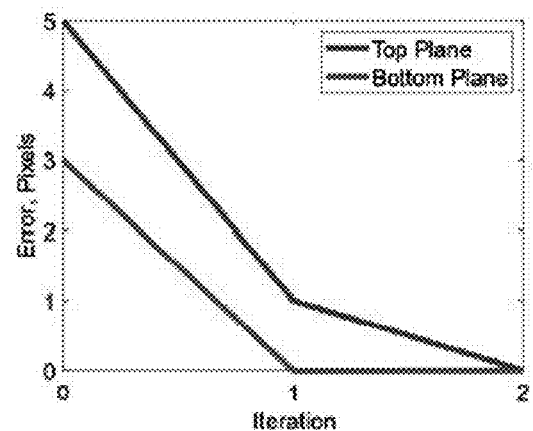
FIG. 8B shows experimental results of an MRI-based visual servoing positioning controllers in accordance with an illustrative embodiment.
Figure 8C:
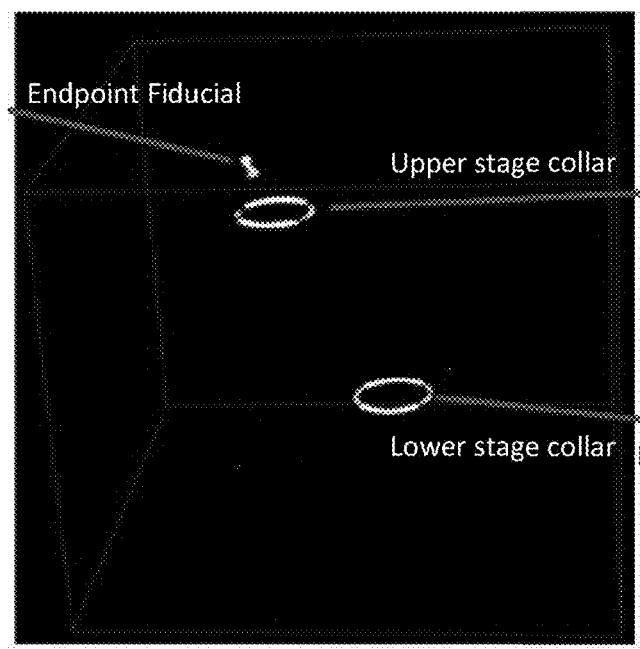
FIG. 8C shows images generated by the MRI-based visual servoing positioning in accordance with an illustrative embodiment.

The study observed repeatability of cannula motion was generally less than 60 microns (std.). A comparison was performed using a camera-guided positioning controls (using the external camera) and the MRI-based visual servoing positioning. FIG. 8A shows experimental results of a camera-based positioning controls, and FIG. 8B shows experimental results of an MRI-based visual servoing positioning controllers. As shown in FIG. 8B, the accuracy of the robot was observed to be imaging method dependent, with the more accurate feedback of the camera requiring more iterative position updates than the MRI scanner positioning. In addition, it was observed from the study that the use of an MRI robot can improve SNR of a MRE measurement of the phantom by 7%. FIG. 8C shows images generated by the MRI-based visual servoing positioning. In FIG. 8C, no visible artifacts appears to be produced by the robot.

The study suggested MRI-based visual servoing positioning system can provide important advantages for instruments and interventional tools. It also suggested that parallel plane mechanism may be suitable for accurate and fast visual servo control because of the planar movements of fiducials, as well as the piezoelectric direct drive.

Benchtop Positioning Experiments and Results.

The study also evaluated two controls methods: (i) 5DOF based Jacobian controls and (ii) two-phase positioning controls.

1) Five Degree of Freedom Jacobian.

Figure 8D:
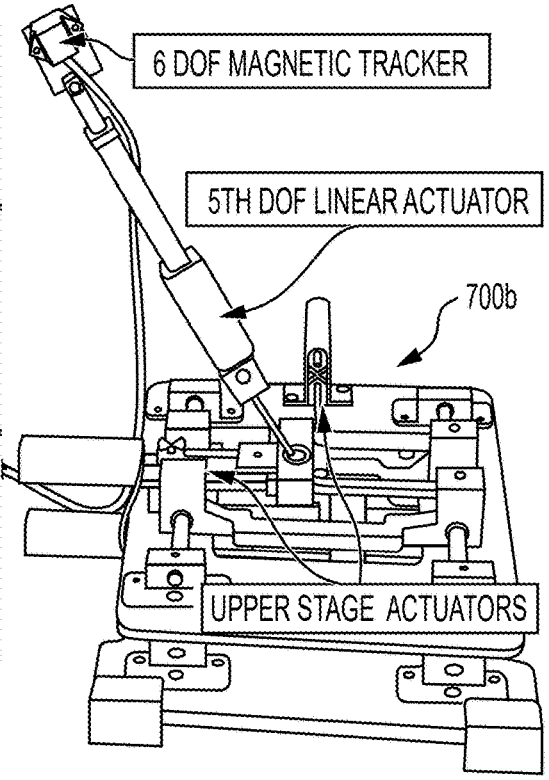
FIG. 8D shows a benchtop experimental setup for an MRI-based visual servoing system in accordance with an illustrative embodiment.

The control method and robot design were validated in a 5 DOF positioning experiment. The MRI conditional rotary actuator and ball-screw mechanism described above was replaced with a ferromagnetic DC linear actuator, due to availability constraints. The DC motor was controlled on a time basis with 1 ms of power supplied compared to a single step of the rotary actuator. Here, "step" refers to a single step of the linear piezoelectric actuators as well as 1 ms driving time of the linear DC motor. Position measurements were obtained via a 6 DOF magnetic tracker fixed in place of the MRE actuator and the robot endpoint. Only the first 5 DOF were used in the course of the experiment, replicating the information obtained from measurement of the 5 DOF endpoint fiducial in FIG. 8C. FIG. 8D shows a benchtop experimental setup for an MRI-based visual servoing and evaluating positioning using a magnetic tracker.

Figure 8E:
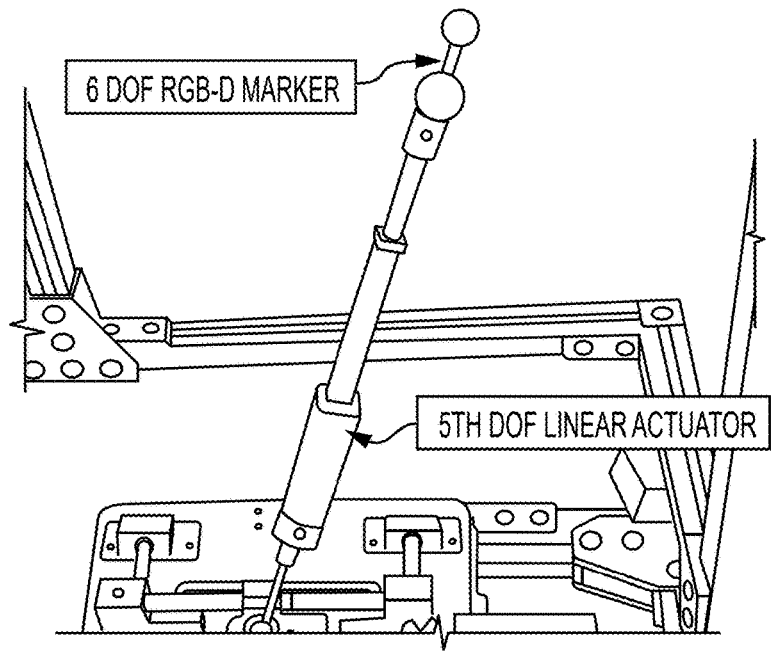
FIG. 8E shows the evaluation of the visual fiducial in the benchtop experimental setup of FIG. 8D in accordance with an illustrative embodiment.
Figure 8F:
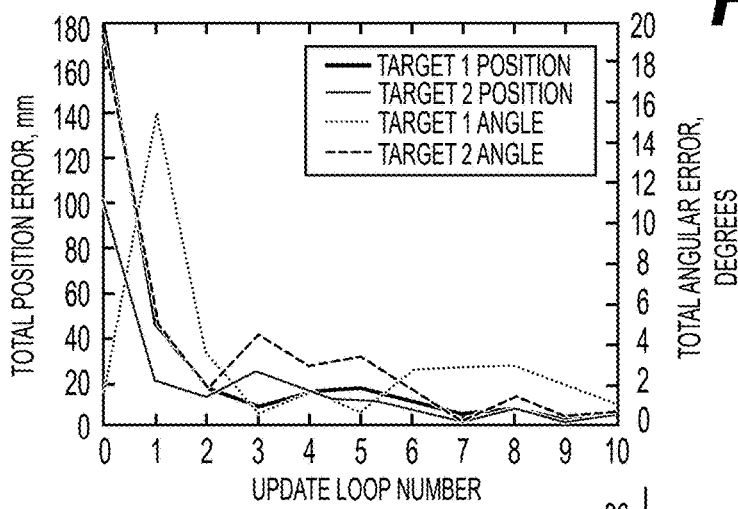
FIGS. 8F and 8G show experimental results for the 5 DOF benchtop experiment of FIG. 8D in accordance with an illustrative embodiment.
Figure 8G:
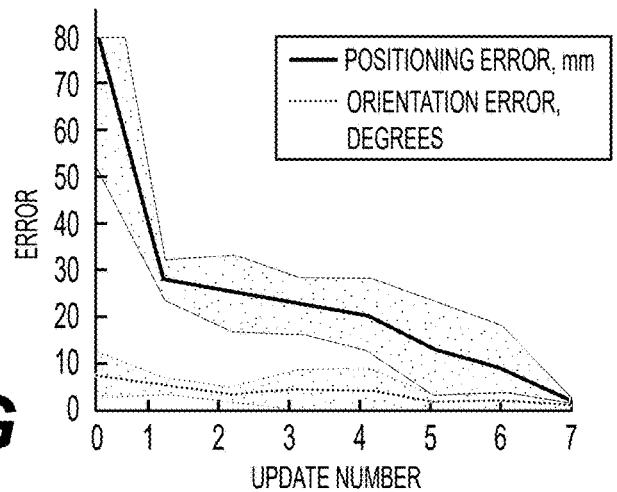

FIGS. 8F and 8G show experimental results for the 5 DOF positioning experiment. In FIG. 8F, the results in the evaluation of both position and orientation error is shown for 10 updates at two different target locations. In FIG. 8G, the performance of 5 DOF positioning Jacobian is shown with respect to position and orientation errors. The mean and standard deviation errors are shown. For the 5DOF image Jacobian method, after 10 iterations final errors were 3.55 and 0.89 degrees.

2) Two Phase Positioning Control.

In addition to the 5 DOF control, a second control configuration of a 4 DOF planar positioning step was developed and evaluated. The 4DOF employs a separate control mechanism to advance the 5th DOF actuator. Planar positions were measured via an RGB-D camera (Intel RealSense). In this second configuration, a 4 DOF image Jacobian was used to relate the planar position of each ball joint to the motion of the actuators. Within this control, after each ball joint reached the desired location, the $5^{th}$ DOF actuator was extended to place the endpoint at the target location.

FIG. 8E shows the evaluation of the visual fiducial in the benchtop experimental setup of FIG. 8D in accordance with an illustrative embodiment. In FIG. 8E, the location and orientation accuracy that were measured via the visual fiducial. In the benchtop experiments, target locations and endpoint locations were experimentally determined prior to beginning the experiments. In the MRI scanner, only the fiducials are visible, so target locations for the ball joints can be computed from a desired endpoint location and orientation. For the 4+1 control method, final mean error was observed to be about 1.8 mm and 0.78 degrees.

Discussion.

1) Image Jacobian Design.

With respect to image Jacobian control, it is noted that the last column of the Jacobian can contain either negative or positive values in the top 2 rows, while all other entries should have constant signs through the entire workspace of the robot. This can easily be verified geometrically. The sign changes in the last column arise because the change in position due to motion of the rotary actuator depends on the configuration of the other 4 actuators. The sign changes prevent the use of a single Jacobian for control in the entire workspace. Dividing the workspace into 4 quadrants based on the possible signs of the two varying entries is one potential method to allow use image Jacobian control without the additional time to re-estimate the Jacobian at each configuration. However, the strategy of dividing the workspace may not work near the boundary, and will require 4 Jacobians to be estimated, taking an additional 16 MRI scans. Observing that the image Jacobian entries corresponding to the 4 linear actuators do not change signs, a faster control methodology can be employed. The 4 DOF image Jacobian can be estimated anywhere in the workspace, and used to control the ball joint locations, then the 5th DOF actuator can simply extend the MRE actuator to the target. This method allows the Jacobian to only be estimated once, a significant saving of scanner time. The control methods evaluated above both achieved satisfactory positioning and orientation accuracy, but the two-phase approach brings additional benefits.

2) Medical Robots.

As medical robots are becoming an essential part of the clinician's arsenal for biopsy, diagnosis, therapy, and prognosis [9]-[14], precise robot control in clinical settings is especially crucial for the success of the targeted outcome. Major challenges during closed loop control of robotic systems are use of expensive sensory equipment for feedback, latency between the received feedback by the master and execution of action by the slave [15]. These challenges can be overcome by benefiting from visual servoing [16]. In visual servoing, simultaneous detection and tracking of the surgical instrument/robotic manipulator with the targeted tissue/body area being inside the field of view can be performed. As expected, the quality of acquired images for visual servoing are affected by the imaging device being used. This device can be an external camera, microscope, or an endoscope. In addition, to these devices that contain optical lenses medical imaging modalities such as (MRI), computed tomography (CT), ultrasound (US), X-ray fluoroscopy, or endoscopic imaging can be used [17].

MRI-Guided Visual Servoing for Magnetic Resonance Elastography (MRE)

In another aspect, the exemplary MRI-guided visual servoing is disclosed for use in Magnetic Resonance Elastography (MRE). The exemplary MRE driver positioning system can be used for image guided MRE that is targeted to be used for the assessment of disc degeneration in the lumbar region in vivo non-invasively, among other applications.

Magnetic Resonance Elastography (MRE) is a developing imaging technique that enables non-invasive estimation of tissue mechanical properties through the combination of induced mechanical displacements in the tissue and Magnetic Resonance Imaging (MRI). The mechanical drivers necessary to produce shear waves in the tissue have been a focus of engineering effort in the development and refinement of the MRE imaging technique. For large and relatively soft tissues, such as the liver and brain, pneumatic, electromagnetic and piezoelectric actuators have all found success. However, the potential targeting of smaller and stiffer tissues calls for increases in actuation frequency.

Higher frequency actuators require increased placement accuracy, because of increased attenuation. Furthermore, due to the anisotropic nature of soft tissues, mechanical actuation position-related changes affect the observed displacement wave patterns. Having the aforementioned incidents, increase in wave attenuation and changes in displacement wave patterns, led our team to investigate the concept of MRE actuator re-positioning through visual-servoing under MR imaging. This work demonstrates the initial prototype of an MRE actuator positioning system, allowing to capture displacement wave patterns from various mechanical vibration loading angles. Wave patterns are being captured by re-positioning the MRE driver unit relative to the tissue-mimicking phantom inside the scanner bore. The repositioning task is being performed by hydraulic manipulators that are low in cost and MR safe.

MRE is a phase contrast-based MRI technique which is sensitive to cyclic harmonic loading. MRE allows clinicians to assess the health of a tissue based on its mechanical properties [1]. During MRE imaging of smaller and stiffer tissues, the shear wavelength should not surpass the size of the region of interest (ROI). That is, sufficient amount of data having adequate temporal resolution needs to be collected in a single period of cyclic harmonic loading to avoid aliasing. For instance, performing MRE on a small tissue such as the intervertebral disc (IVD) requires the targeting of shear displacements so as to maximize the SNR in the ROI [2], [3]. Although increased actuation frequency allows placement of shorter wavelengths in a given ROI which can cause an increase in SNR, challenges with attenuation caused multi-driver units to be investigated [4]-[7]. With multi-driver units, it is aimed to illuminate the ROI in a more uniform fashion through constructive wave interference [6]. Also, past efforts have utilized manual placement of drivers for brain MRE [8], but for more targeted tissue movement, control of driver positioning is needed.

Among these modalities, MRI surpasses the others by having better soft tissue contrast, volumetric imaging capability, high spatial resolution, and high sensitivity for detecting small regions [18]. MRI-guided visual servoing may improve MRE measurements for disc degeneration evaluation. Application of MRE imaging to identifying the degeneration level of the intervertebral disc (IVD) is already performed by few research groups mostly on excised IVD tissue [19]-[21]. However, using the MRI scanner as a feedback device through visual output in order to control the MRE actuator position is novel.

Degenerative disc disease is a common causes of low back and neck pain. Degenerative disc disease generally refers to symptoms of back or neck pain caused by wear-and-tear on a spinal disc. In some cases, degenerative disc disease also causes weakness, numbness, and hot, shooting pains in the arms or legs (radicular pain). Degenerative disc disease typically consists of a low-level chronic pain with intermittent episodes of more severe pain.

Figure 9:
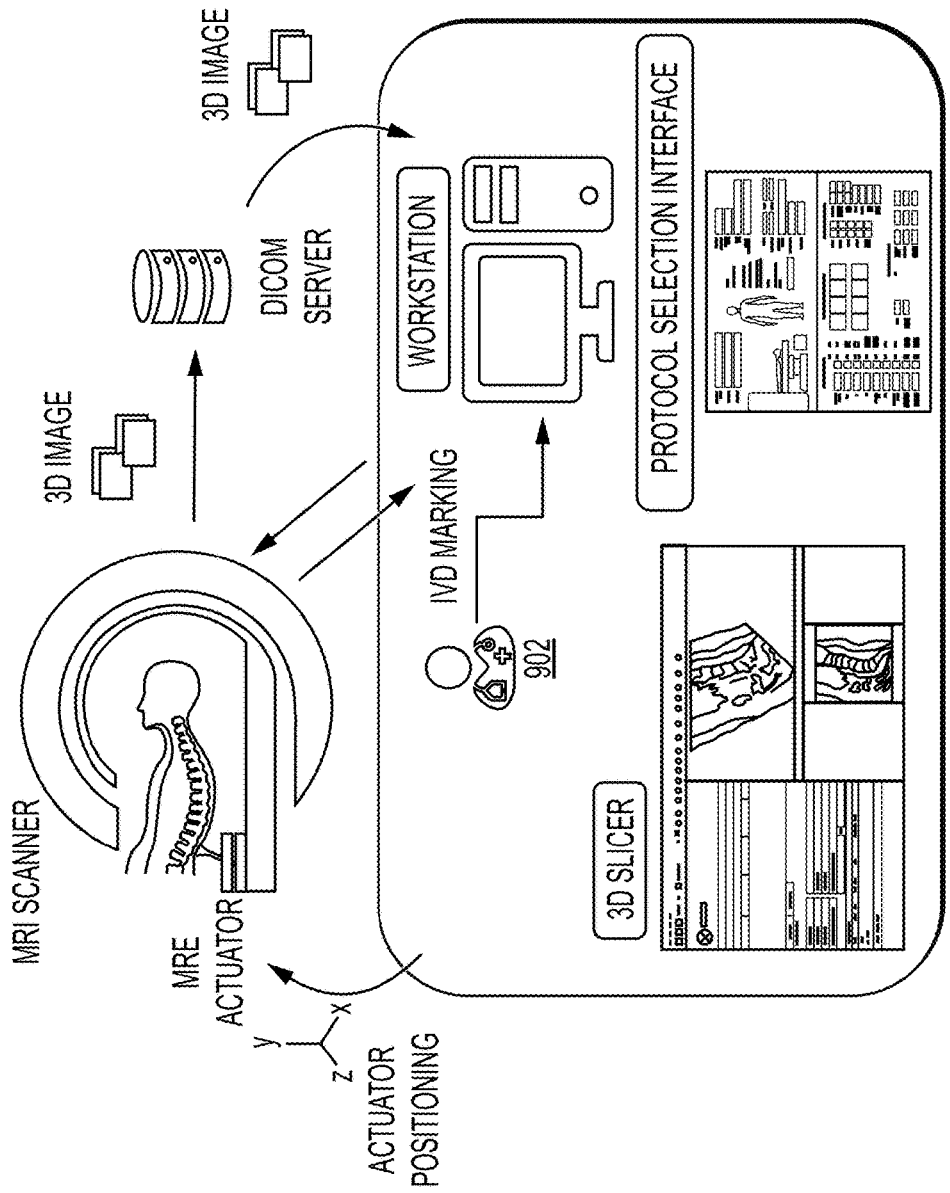
FIG. 9 is a diagram showing an example MRI-guided visual servoing operation in the magnetic resonance elastography (MRE) application in accordance with an illustrative embodiment.

FIG. 9 is a diagram showing an example MRI-guided visual servoing operation in the magnetic resonance elastography (MRE) application in accordance with an illustrative embodiment. As shown in FIG. 9, 3D images (e.g., 104) are received from an MRI scanner and used to direct actuator positioning of the MRI robot 700b having an MRE actuator. An operator 802 provides a IVD marking target of a subject (e.g., a phantom) to an MRI-guided feedback controller (e.g., 112).

Experimental Results of Magnetic Resonance Elastography Using MRI-Guided Visual Servoing and Additional Examples The conducted study described herein also developed and evaluated a magnetic resonance elastography (MRE) application to evaluate tissue mechanical properties.

Simulations of MRE Orientation Adjustment.

Through numerical simulation using Abaqus, the effect of harmonic loading angle on captured propagating wave fields for MRE assessment is investigated. For the simulation, a 0.001 kg/m$^3$ cubic volumetric model having an isotropic elastic material (E=5 kPa, r=1100 kg=m$^3$, n=0.45) is defined. Then a 60 Hz harmonic surface traction load having a magnitude of 1N is subjected to a 0.0016 m$^2$ square surface area of the model. In the simulation, fixed boundary conditions are assigned to all of the nodes along the cube's surfaces except the top surface.

Three simulations were run having a loading surface angle of 90°, 68°, and 45°. During each simulation, a 0.005 meter-mesh seeding was assigned, and a 4-node linear tetrahedral mesh element was used. Delivery of harmonic loading (15 cycles) having a vibration frequency of 60 Hz along the cubic volume was targeted throughout the whole simulation duration. The simulation was performed for 0.25 seconds. During this time, 120 equally distanced time offset images are captured.

Figure 10A:
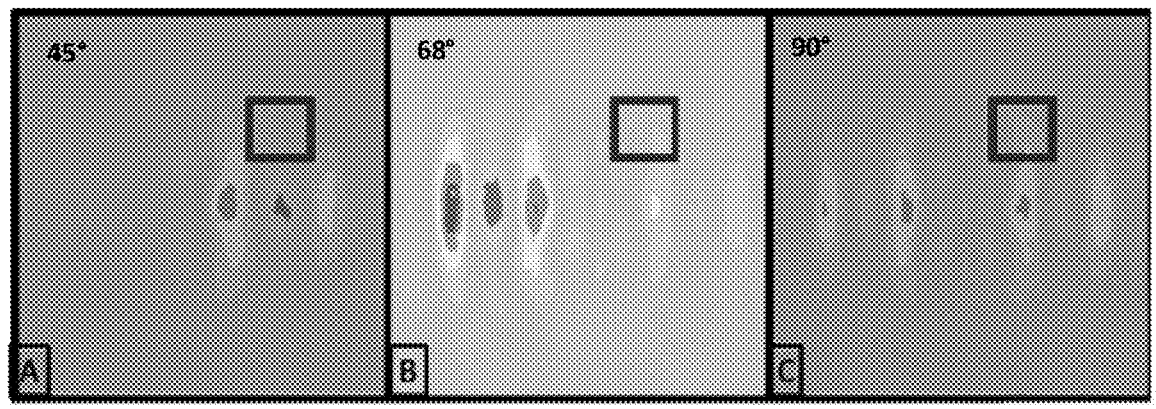
FIG. 10A shows simulation results for MRE measurement at different orientation in accordance with an illustrative embodiment.

FIG. 10A shows simulation results for MRE evaluation at different orientation in accordance with an illustrative embodiment. In FIG. 10A, the displacement fields were constrained to a constant sinusoidal driving input that are varied for an incident angle of 45°, 68°, 90°. The ROI (shown by the box) were evaluated for a pairwise t-test to confirm significance. FIG. 10A shows wave field images for a view cut that is 0.015 m lower than the mid surface cut and that is parallel to the z-x plane is shown. The wave field images are also shown from the 22nd time frame.

Figure 10B:
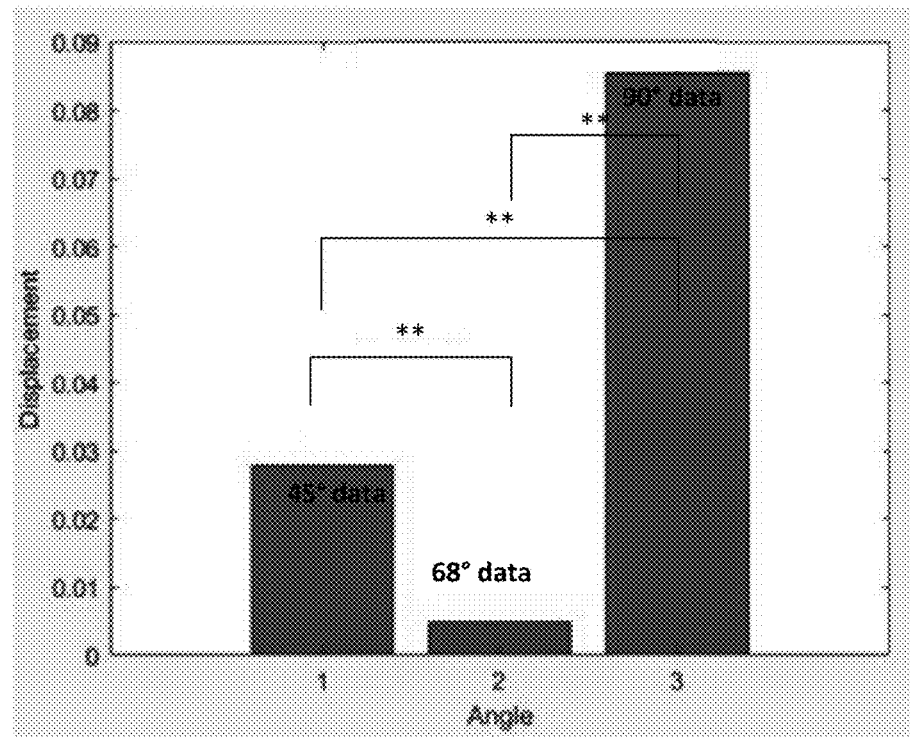
FIG. 10B shows displacement field strength of MRE measurement for each of the assessed incident angles in accordance with an illustrative embodiment.

Qualitatively, the displacement fields observed for the 3 incident angle conditions have clear differences through the entire phantom. For the qualitative analysis, a small ROI was used that is consistent with the expected resolution from use with the MRI-guided visual servo positioning. In the assessed ROI, the amplitude was compared pairwise between each pixel, with a paired t-test. FIG. 10B shows displacement field strength at the ROI of FIG. 10A for each of the assessed incident angles. The t-test results show a significant difference (p<0.0014 where p<0.05 is significant) between the 3 angles as denoted by the symbol "**". Indeed, varying the orientation of the interrogation of the MRE driver produces a significant change in the amplitude of the displacements observed in a region and having granular orientation control as provided by MRI-guided visual servo positioning described herein would provide significant improvement to the control such MRE system.

MRE and Phantom Evaluation.

Figure 10C:
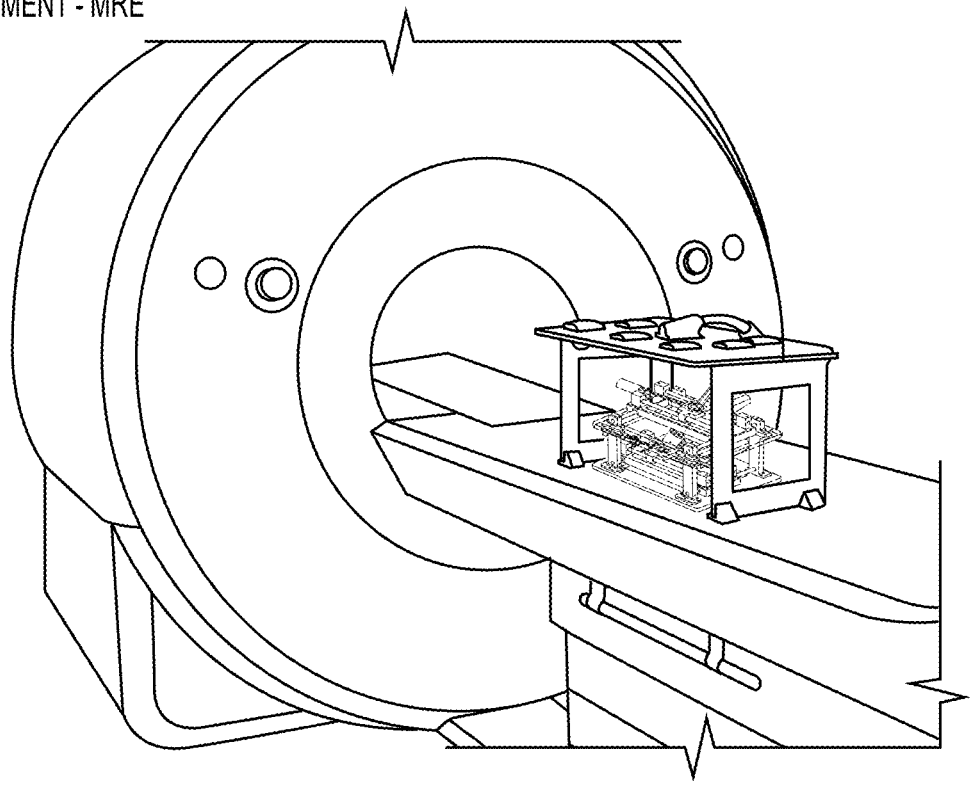
FIG. 10C shows an example 5DOF MRE actuator system configured with MRI-guided visual servoing in accordance with an illustrative embodiment.
Figure 10D:
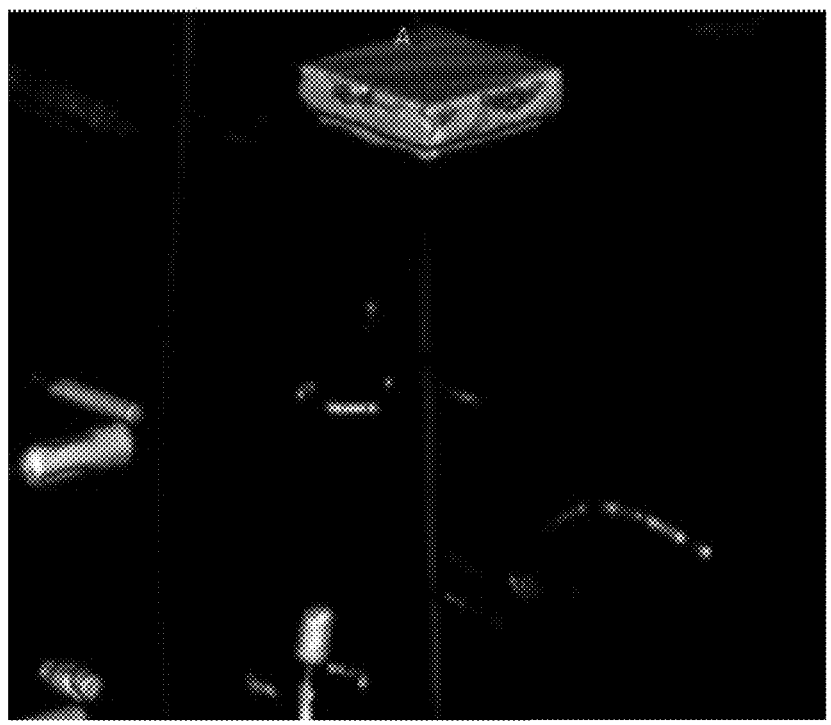
FIG. 10D shows a representative morphological scan of a phantom in an MRI scanner in accordance with an illustrative embodiment.

The study also comprised experimental evaluation of the MRE actuator system and MRI-guided visual servoing. The evaluation was performed in a 3T MRI (Siemens Trio). FIG. 10C shows an example 5DOF MRE actuator system configured with MRI-guided visual servoing (700a). The 5 DOF MRE actuator system was placed below a phantom structure containing the gelatin phantom, with the spine RF coil placed above the phantom. Morphological and MRE sequences were utilized, with the morphological scans providing robot configuration confirmation. FIG. 10D shows a representative morphological scan of the phantom in the test configuration of FIG. 10C. MRE scans were performed for each of the X robot configurations. Actuation was provided via MRI compatible hydraulic actuators manually positioned so as to reproduce the effective range of the robot.

Servoing Pipeline.

The positions of ring-shaped cavities inside the x-axis carriers and the spherical cavities at the tip of the rod are captured during the localization step of the morphological scan performed via MRI. Inside the field of view of this initial scan, the Knox gelatin phantom situated above the parallel stage mechanism is also captured. This morphological scan is then transferred to a local computer from the DICOM server.

The transferred image data set is first displayed as a rendered 3D volume for the target location to be selected inside the Knox gelatin phantom volume. This is performed by placing a marker at the target location in the visualization software called 3D Slicer. Then thresholding is performed to generate a binary image volume in which end point fiducial, upper-lower stage collars are seen. This is followed by placement of markers at the center of each collar and the end point fiducial. Afterwards, a line is passed through end point fiducial and the lower stage collar. This line is then aligned vertically with the marked target point. Finally, while the upper carriers being kept fixed, the center of the lower collar is positioned by driving the linear piezo motors in the lower stage.

Figure 10E:
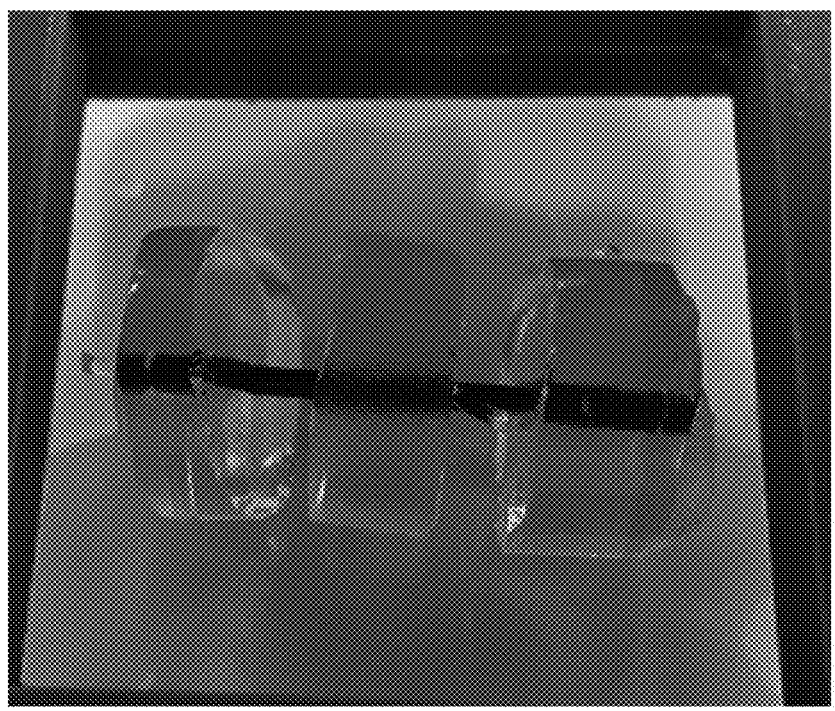
FIG. 10E shows the phantom of FIG. 10D in accordance with an illustrative embodiment.

FIG. 10E is an image of a phantom (e.g., a Knox gelatin phantom) that was prepared to evaluate the positioning mechanism. In FIG. 10E, the phantom is shown to comprise three-disc shaped phantom sections each made out of 100 ml-Knox:500 ml-water mixture that is placed inside a substrate made of a 35 ml-Knox:500 ml-water mixture. A plastic rod is passed through the disc shaped phantoms to hold the sections in place. During the preparation of both mixtures, Knox gelatin is dissolved in water and heated using a microwave for 80 seconds and then placed in vacuum chamber for 30 seconds before being poured into a mold.

Figure 10F:
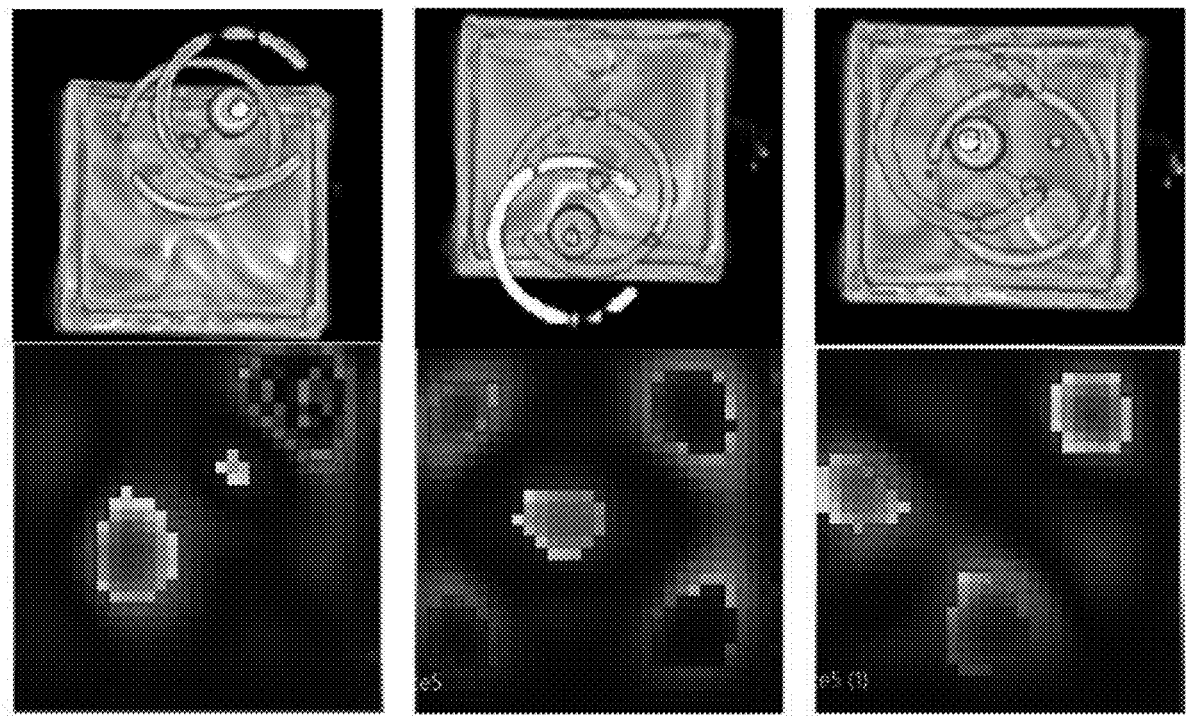
FIG. 10F shows experimental results of MRE measurements acquired using the MRE actuator system and MRI-guided visual servoing of FIG. 10C in accordance with an illustrative embodiment.

FIG. 10F shows experimental results of MRE measurements acquired using the MRE actuator system and MRI-guided visual servoing of FIG. 10C. In FIG. 10F, displacement fields and associated robot configurations for an assessed orientation of 45°, 68°, 90°.

FIG. 10F shows the clear differences in displacement fields achieved by varying the contact angle of the MRE driver. This result has not previously been demonstrated in MRE, and the applications are numerous. Particularly, modulation of the wave field may enable realization of advanced MRE techniques to investigate smaller and stiffer tissues located in regions of the body beyond the reach of traditional driver technologies.

Figure 11:
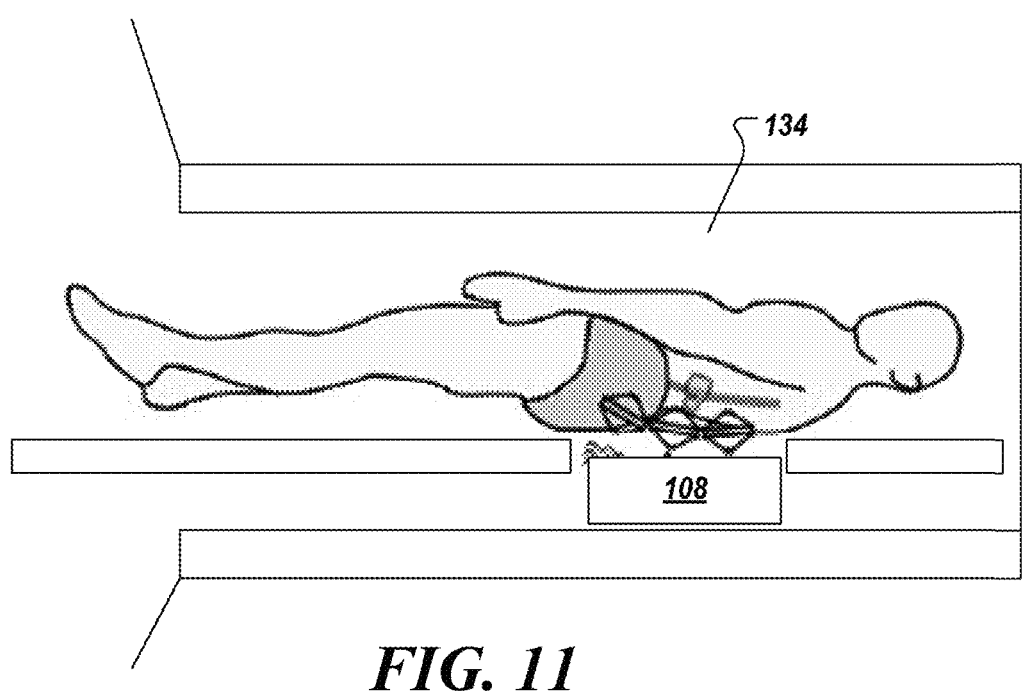
FIG. 11 shows a configuration of an example MRE actuation system in an MRI scanner in accordance with an illustrative embodiment.

FIG. 11 shows a configuration of an example MRE actuation system (e.g., 700a, 700b) in an MRI scanner. The MRE actuation system may be integrated into the bed platform of the scanner to allow the subject to lay over the MRE actuation system while provide clear access to the subject spinal column. Indeed, the MRI medical robots (e.g., 108) may be fixably attached to other locations in the bore of the MRI scanner.

MRE Discussion.

While mechanical drivers necessary to produce shear waves in the tissue have been a focus of engineering effort in the development and refinement of the MRE imaging technique. For large and relatively soft tissues, such as the liver and brain, pneumatic, electromagnetic and piezoelectric actuators have all found success. However, the potential targeting of smaller and stiffer tissues calls for increases in actuation frequency. Higher frequency actuators require increased placement accuracy, because of increased attenuation. Furthermore, due to the anisotropic nature of soft tissues, mechanical actuation position-related changes affect the observed displacement wave patterns. Having the aforementioned incidents, increase in wave attenuation and changes in displacement wave patterns, led the study to the investigation of MRE actuator re-positioning through visual-servoing under MR imaging. The study demonstrates the initial prototype of an MRE actuator positioning system, allowing to capture displacement wave patterns from various mechanical vibration loading angles. Wave patterns are being captured by re-positioning the MRE driver unit relative to the tissue-mimicking phantom inside the scanner bore. The repositioning task is being performed by hydraulic manipulators that are low in cost and MR safe.

Disc Degeneration Discussion.

Disc degeneration is a prevalent disease with significant costs and challenges. MRE would provide a better picture of prognosis, but technical limitations prevent widespread adoption. The proposed idea, which is building an MR Elastography (MRE) actuator mechanism for intervertebral imaging, will allow radiologists to attain a stiffness map of the IVD and the propagating wave field profile on the IVD volume. Stiffness map and wave field profile can be used to pre-diagnose the onset of a possible tearing on the AF. By having this knowledge at the early stages of DDD, precautions can be taken to avoid progression of the disease at early stages. This can prevent the person to go through expensive surgeries in the future. Positioning of MRE actuators to optimize stiffness map quality presents a significant advantage over static MRE. This is particularly important for tissues with smaller geometries, as high frequency actuation is needed.

Degenerative disc disease is present in ~90% of the population over age 50 (some may be asymptomatic). MR Elastography system developed by Resoundant is being currently used at 1400+ locations for liver fibrosis diagnosis purposes but is limited because the actuator positioning is fixed. The instant system may be similar used.

Emerging MRI enabled interventions both for treatment and diagnosis of spinal column conditions require precise and rapid position control in the MRI environment. Although Magnetic Resonance Elastography and intraspinal injections target different disorders, and require different levels of invasiveness, both procedures stand to benefit from precise positioning and orientation. In the case of intraspinal injection, improvements to positioning will allow for a faster and more accurate injection procedure under MRI guidance, that will also be much less invasive than open surgery. In the case of MRE, specific targets such as the intervertebral discs (IVD) are located behind the layers of attenuating tissue, and require high frequency actuation, due to geometric constraints. Because of these two factors, accurate positioning of the shear wave fields relative to the disc is critical and will be optimized through position control of the MRE actuator. In both above applications, positioning accuracy and overall procedure time are critical to clinical feasibility, for that reason, a parallel plane mechanism with unique attributes for both positioning time and accuracy is developed and described.

Example Computing Device

Figure 12:
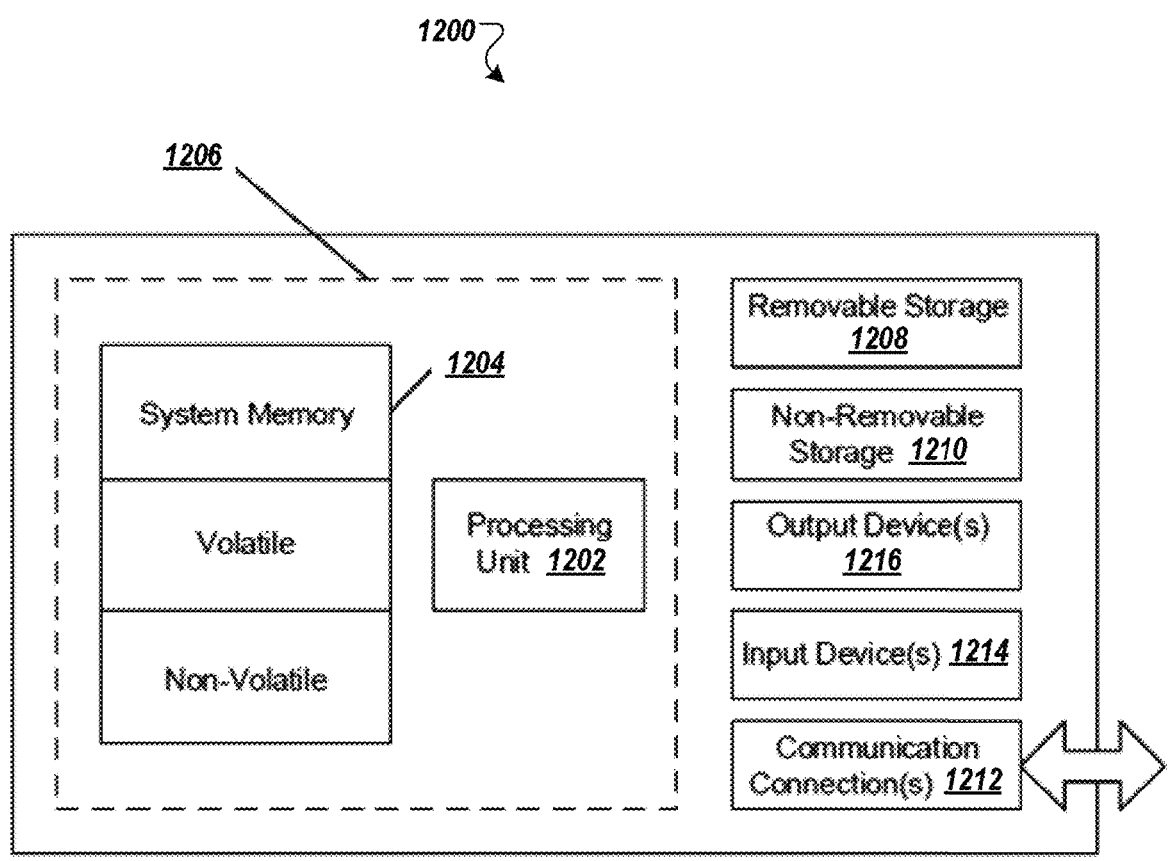
FIG. 12 shows an example computing environment in which example embodiments of the MRI-guided feedback and aspects thereof may be implemented.

FIG. 12 shows an example computing environment in which example embodiments of the MRI-guided feedback (e.g., 112) and aspects thereof may be implemented in, e.g., a device or devices, among others. The computing device environment is only one example of a suitable computing environment and is not intended to suggest any limitation as to the scope of use or functionality.

Numerous other general-purpose or special purpose computing devices environments or configurations may be used. Examples of well-known computing devices, environments, and/or configurations that may be suitable for use include, but are not limited to, personal computers, server computers, handheld or laptop devices, mobile phones, wearable devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an example system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random-access memory (RAM)), non-volatile (such as read-only memory (ROM), flash memory, etc.), or some combination of the two. This most basic configuration is illustrated in FIG. 12 by dashed line 1206. Computing device 1200 may have additional features/functionality. For example, computing device 1200 may include additional storage (removable and/or non-removable) including, but not limited to, magnetic or optical disks or tape. Such additional storage is illustrated in FIG. 12 by removable storage 1208 and non-removable storage 1210. Computing device 1200 typically includes a variety of computer readable media. Computer readable media can be any available media that can be accessed by the device 1200 and includes both volatile and non-volatile media, removable and non-removable media. Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device 1200. Any such computer storage media may be part of computing device 1200. Computing device 1200 may contain communication connection(s) 1212 that allow the device to communicate with other devices. Computing device 1200 may also have input device(s) 1214 such as a keyboard, mouse, pen, voice input device, touch input device, etc., singly or in combination. Output device(s) 1216 such as a display, speakers, printer, vibratory mechanism, etc. may also be included singly or in combination. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

It should be appreciated that any of the components or modules referred to with regards to any of the present embodiments discussed herein, may be integrally or separately formed with one another. Further, redundant functions or structures of the components or modules may be implemented. Moreover, the various components may be communicated locally and/or remotely with any user/clinician/patient or machine/system/computer/processor.

Moreover, the various components may be in communication via wireless and/or hardwire or other desirable and available communication means, systems and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a "subject" may be any applicable human, animal, or other organism, living or dead, or other biological or molecular structure or chemical environment, and may relate to particular components of the subject, for instance specific tissues or fluids of a subject (e.g., human tissue in a particular area of the body of a living subject), which may be in a particular location of the subject, referred to herein as an "area of interest" or a "region of interest."

It should be appreciated that as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g., rat, dog, pig, monkey), etc. It should be appreciated that the subject may be any applicable human patient, for example.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth 10 reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5).

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

LIST OF REFERENCES

[1] R. Muthupillai, P. J. Rossman, D. J. Lomas, J. F. Greenleaf, S. J. Riederer, and R. L. Ehman, "Magnetic resonance imaging of transverse acoustic strain waves," Magnetic Resonance in Medicine, vol. 36, no. 2, pp. 266-274, 1996.

[2] K.-J. Streitberger, G. Diederichs, J. Guo, A. Fehlner, B. Hamm, J. Braun, and I. Sack, "In vivo multifrequency magnetic resonance elastography of the human intervertebral disk," Magnetic Resonance in Medicine, vol. 74, no. 5, pp. 1380-1387, 2015.

[3] B. A. Walter, P. Mageswaran, X. Mo, D. J. Boulter, H. Mashaly, X. V. Nguyen, L. M. Prevedello, W. Thoman, B. D. Raterman, P. Kalra et al., "Mr elastography—derived stiffness: a biomarker for intervertebral disc degeneration," Radiology, vol. 285, no. 1, pp. 167-175, 2017.

[4] Y. Zheng, Q. Chan, and E. Yang, "Magnetic resonance elastography with twin drivers for high homogeneity and sensitivity," in 2006 International Conference of the IEEE Engineering in Medicine and Biology Society. IEEE, 2006, pp. 1916-1919.

[5] Y. Zheng, G. Li, M. Chen, Q. C. Chan, S.-G. Hu, X.-N. Zhao, R. L. Ehman, E. Y. Lam, and E. Yang, "Magnetic resonance elastography with twin pneumatic drivers for wave compensation," in 2007 $29^{th}$ Annual International Conference of the IEEE Engineering in Medicine and Biology Society. IEEE, 2007, pp. 2611-2613.

[6] Y. K. Mariappan, P. J. Rossman, K. J. Glaser, A. Manduca, and R. L. Ehman, "Magnetic resonance elastography with a phased-array acoustic driver system," Magnetic Resonance in Medicine: An Official Journal of the International Society for Magnetic Resonance in Medicine, vol. 61, no. 3, pp. 678-685, 2009.

[7] W. Neumann, V. R. Lehnart, Y. Vetter, A. Bichert, L. R. Schad, and F. G. Zöliner, "Coupled actuators with a mechanically synchronized phase during mr elastography: A phantom feasibility study," Concepts in Magnetic Resonance Part B: Magnetic Resonance Engineering, vol. 48, no. 4, p. e21403, 2018.

[8] A. T. Anderson, E. E. Van Houten, M. D. McGarry, K. D. Paulsen, J. L. Holtrop, B. P. Sutton, J. G. Georgiadis, and C. L. Johnson, "Observation of direction-dependent mechanical properties in the human brain with multi-excitation mr elastography," Journal of the mechanical behavior of biomedical materials, vol. 59, pp. 538-546, 2016.

[9] C. Stüuer, F. Ringel, M. Stoffel, A. Reinke, M. Behr, and B. Meyer, "Robotic technology in spine surgery: current applications and future developments," in Intraoperative imaging Springer, 2011, pp. 241-245.

[10] F. Roser, M. Tatagiba, and G. Maier, "Spinal robotics: current applications and future perspectives," Neurosurgery, vol. 72, no. suppl 1, pp. A12-A18, 2013.

[11] A. Bertelsen, J. Melo, E. S'anchez, and D. Borro, "A review of surgical robots for spinal interventions," The International Journal of Medical Robotics and Computer Assisted Surgery, vol. 9, no. 4, pp. 407-422,2013.

[12] S. C. Overley, S. K. Cho, A. I. Mehta, and P. M. Arnold, "Navigation and robotics in spinal surgery: where are we now?" Neurosurgery, vol. 80, no. 3S, pp. S86—S99, 2017.

[13] J. Huang, Y. Li, and L. Huang, "Spine surgical robotics: review of the current application and disadvantages for future perspectives," Journal of robotic surgery, vol. 14, no. 1, pp. 11-16,2020.

[14] W. Meinhold, D. E. Martinez, J. N. Oshinski, A.-P. Hu, and J. Ueda, "A direct drive parallel plane piezoelectric needle positioning robot for mri guided intraspinal injection," IEEE Transactions on Biomedical Engineering, 2020.

[15] M. J. Lum, J. Rosen, H. King, D. C. Friedman, T. S. Lendvay, A. S. Wright, M. N. Sinanan, and B. Hannaford, "Teleoperation in surgical robotics—network latency effects on surgical performance," in 2009 Annual International Conference of the IEEE Engineering in Medicine and Biology Society. IEEE, 2009, pp. 6860-6863.

[16] S. Hutchinson, G. D. Hager, and P. I. Corke, "A tutorial on visual servo control," IEEE transactions on robotics and automation, vol. 12, no. 5, pp. 651-670,1996.

[17] M. Azizian, M. Khoshnam, N. Najmaei, and R. V. Patel, "Visual servoing in medical robotics: a survey. part i: endoscopic and direct vision imaging—techniques and applications," The international journal of medical robotics and computer assisted surgery, vol. 10, no. 3, pp. 263-274,2014.

[18] M. Azizian, N. Najmaei, M. Khoshnam, and R. Patel, "Visual servoing in medical robotics: a survey. part ii: tomographic imaging modalities—techniques and applications," The international journal of medical robotics and computer assisted surgery, vol. 11, no. 1, pp. 67-79, 2015.

[19] D. H. Cortes, J. F. Magland, A. C. Wright, and D. M. Elliott, "The shear modulus of the nucleus pulposus measured using magnetic resonance elastography: a potential biomarker for intervertebral disc degeneration," Magnetic Resonance in Medicine, vol. 72, no. 1, pp. 211-219,2014.

[20] E. I. Ben-Abraham, J. Chen, J. P. Felmlee, P. Rossman, A. Manduca, K.-N. An, and R. L. Ehman, "Feasibility of MR elastography of the intervertebral disc," Magnetic resonance imaging, vol. 39, pp. 132-137,2017.

[21] P. Beauchemin, P. Bayly, J. Garbow, J. Schmidt, R. Okamoto, F. Chériet, and D. Périé, "Frequency-dependent shear properties of annulus fibrosus and nucleus pulposus by magnetic resonance elastography," NMR in Biomedicine, vol. 31, no. 10, p. e3918, 2018.

[222] Waiman Meinhold, John Oshinski, Ai-Ping Hu, Jun Ueda, "Design and fabrication of an automated spinal precision injection robot," BMES Annual Conference 2019.

What is claimed is:

1. A system for guiding a positioning instrument, the system comprising:
a processor; and
a memory having instructions stored thereon, wherein execution of the instructions by the processor cause the processor to:
continuously obtain image data from a magnetic resonance imaging (MRI) scanner to provide visual feedback that guides movement of at least one actuator of the positioning instrument;
generate an image Jacobian based on an image coordinate frame extracted from the image data, wherein the image Jacobian comprises a Jacobian matrix that relates actuator positions of the positioning instrument to a driver orientation of the positioning instrument;
determine a plurality of fiduciary landmarks on the positioning instrument using the image Jacobian;
determine a position and an orientation of a probe of the positioning instrument based on the determined fiduciary landmarks; and
direct movement of the probe based on the determined position and orientation.

2. The system of claim 1, wherein the image Jacobian comprises a single Jacobian matrix determined for the actuator positions of the positioning instrument.

3. The system of claim 1, wherein the continuously obtained image data from the MRI scanner is used to provide visual feedback that guides movement of at least four actuators of the positioning instrument.

4. The system of claim 1, wherein the directed movement is performed to optimize an observed wave field in subsequent MRI images.

5. The system of claim 1, further comprising:
the positioning instrument, wherein the positioning instrument is configured to acquire measurements from a subject based on magnetic resonance elastography (MRE) imaging.

6. The system of claim 1, wherein the positioning instrument is configured as at least one of a biopsy instrument, a diagnostic instrument, an ablation instrument, a therapy insertion instrument, and an imaging instrument.

7. The system of claim 1, wherein the positioning instrument is configured to be placed proximal to a subject while the positioning instrument and the subject are positioned in a bore of the MRI scanner.

8. The system of claim 1, wherein the positioning instrument is configured to extend the probe toward a spinal region for spinal column imaging.

9. The system of claim 1, wherein the positioning instrument is integrated into a patient table of the MRI scanner.

10. The system of claim 1, wherein the positioning instrument is configured to be place on top of a subject while the positioning instrument and the subject are positioned in a bore of the MRI scanner.

11. The system of claim 1, wherein the data are continuously obtained, as 3D images, from a DICOM server of the MRI scanner.

12. The system of claim 1, further comprising a supplemental image capture device configured to continuously generate data to provide feedback to guide movement of at least one actuator of the positioning instrument.

13. A non-transitory computer readable medium comprising instructions, wherein execution of the instructions by a processor cause the processor to:
continuously obtain image data from an MRI scanner to provide visual feedback that guides movement of actuators of a positioning instrument;
generate an image Jacobian based on an image coordinate frame extracted from the image data, wherein the image Jacobian comprises a Jacobian matrix that relates actuator positions of the positioning instrument to a driver orientation of the positioning instrument;
determine a plurality of fiduciary landmarks on the positioning instrument using the image Jacobian;
determine a position and an orientation of a probe of the positioning instrument based on the determined fiduciary landmarks; and
direct movement of the probe based on the determined position and orientation.

14. A method to guide a positioning instrument, the method comprising:
continuously obtaining, by a system comprising one or more processors, image data from an MRI scanner to provide visual feedback that guides movement of at least one actuator of a positioning instrument;
generating, by the system, an image Jacobian based on an image coordinate frame extracted from the image data, wherein the image Jacobian comprises a Jacobian matrix that relates actuator positions of the positioning instrument to a driver orientation of the positioning instrument;

determining, by the system, a plurality of fiduciary landmarks on the positioning instrument using the image Jacobian;

determining, by the system, a position and an orientation of a probe of the positioning instrument based on the determined fiduciary landmarks; and directing, by the system, movement of the probe based on the determined position and orientation.

15. The method of claim 14, wherein the Jacobian matrix relates actuator positions of the positioning instrument to a magnetic resonance elastography (MRE) driver orientation.

16. The method of claim 14, wherein the obtained image data from the MRI scanner is used to provide visual feedback for at least one of a biopsy instrument, a diagnostic instrument, an ablation instrument, a therapy insertion instrument, and an imaging instrument.

* * * * *